US012602728B2

(12) United States Patent
Yager et al.

(10) Patent No.: US 12,602,728 B2
(45) Date of Patent: *Apr. 14, 2026

(54) CONNECTED HOME SYSTEM WITH RISK UNITS

(71) Applicant: Allstate Insurance Company, Northbrook, IL (US)

(72) Inventors: Floyd M. Yager, Park Ridge, IL (US); Orlando E. Mercado, Rolling Meadows, IL (US); Ralph Adam Benjamin Tyner, Gurnee, IL (US); Jennifer L. Snyder, Northbrook, IL (US); Laurie Pellouchoud, Northbrook, IL (US); Peggy Klingel, Northbrook, IL (US); Trent Bohacz, Northbrook, IL (US); John Bradley Moats, Gurnee, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,029

(22) Filed: Aug. 23, 2023

(65) Prior Publication Data

US 2024/0046366 A1 Feb. 8, 2024

Related U.S. Application Data

(63) Continuation of application No. 16/716,090, filed on Dec. 16, 2019, now Pat. No. 11,783,423.

(Continued)

(51) Int. Cl.
*G06Q 40/08* (2012.01)
*G06N 5/04* (2023.01)

(52) U.S. Cl.
CPC ............... *G06Q 40/08* (2013.01); *G06N 5/04* (2013.01)

(58) Field of Classification Search
CPC ................................. G06Q 40/08; G06N 5/04
See application file for complete search history.

(56) References Cited

U.S. PATENT DOCUMENTS 5,797,134 A 8/1998 McMillan et al.
5,809,478 A 9/1998 Greco et al.
(Continued)

FOREIGN PATENT DOCUMENTS

KR 101341986 B1 12/2013
KR 101813840 B1 12/2017
WO WO-2015191844 A2 * 12/2015 ............... G06T 7/20

OTHER PUBLICATIONS

Nov. 20, 2023—(US) Final Office Action—U.S. Appl. No. 16/716,185, 24 Pages.

(Continued)

*Primary Examiner* — Peter D Nolan
*Assistant Examiner* — Matthew Cobb

(57) ABSTRACT

Aspects of the disclosure generally relate to monitoring and/or sensing of one or more home devices from one or more homes. In particular, various aspects described herein relate to receiving data from one or more sensors associated with one or more home devices from one or more homes and using the data to determine insurance rates or premiums, discounts, incentives, and the like. Further, aspects of the disclosure relate to computer hardware and software. In particular, one or more aspects of the disclosure relate to the connected home or smart home market (i.e. connected devices and systems within or related to the home) which is rapidly evolving and growing.

20 Claims, 10 Drawing Sheets

Related U.S. Application Data

(60) Provisional application No. 62/779,798, filed on Dec. 14, 2018.

(56) References Cited

U.S. PATENT DOCUMENTS

| | | | |
|---|---|---|---|
| 7,917,292 B1 | 3/2011 | Du | |
| 7,966,203 B1 | 6/2011 | Pietrzak | |
| 8,086,523 B1 | 12/2011 | Palmer | |
| 8,280,752 B1 | 10/2012 | Cripe et al. | |
| 8,332,244 B1 | 12/2012 | Karam et al. | |
| 8,515,788 B2 | 8/2013 | Tracy et al. | |
| 8,589,190 B1 | 11/2013 | Pugh et al. | |
| 8,620,785 B1 | 12/2013 | Wilks et al. | |
| 8,660,864 B2 | 2/2014 | Krause et al. | |
| 8,854,465 B1 * | 10/2014 | McIntyre | B60R 25/1004 |
| | | | 348/148 |
| 9,390,452 B1 | 7/2016 | Biemer et al. | |
| 9,483,795 B1 | 11/2016 | Warden et al. | |
| 9,600,645 B2 * | 3/2017 | Fadell | H04L 67/12 |
| 9,715,711 B1 | 7/2017 | Konrardy et al. | |
| 9,773,281 B1 | 9/2017 | Hanson | |
| 9,811,862 B1 | 11/2017 | Allen et al. | |
| 9,818,158 B1 | 11/2017 | Devereaux et al. | |
| 9,830,663 B2 | 11/2017 | Roberts et al. | |
| 9,984,419 B1 | 5/2018 | Manzella et al. | |
| 9,984,420 B1 | 5/2018 | Manzella et al. | |
| 10,042,341 B1 | 8/2018 | Jacob | |
| 10,140,199 B1 | 11/2018 | Rugel et al. | |
| 10,155,500 B2 * | 12/2018 | Cogill | B60R 25/31 |
| 10,296,978 B1 | 5/2019 | Corder et al. | |
| 10,453,146 B1 | 10/2019 | Stricker et al. | |
| 10,467,701 B1 | 11/2019 | Corder et al. | |
| 10,497,250 B1 | 12/2019 | Hayward et al. | |
| 10,679,296 B1 | 6/2020 | Devereaux et al. | |
| 10,713,934 B2 * | 7/2020 | Sayavong | G06F 16/951 |
| 11,017,480 B2 | 5/2021 | Shah et al. | |
| 11,778,144 B2 * | 10/2023 | Nodder | G08B 13/19647 |
| | | | 348/143 |
| 2004/0236676 A1 | 11/2004 | Takezawa et al. | |
| 2005/0128068 A1 * | 6/2005 | Winick | G08B 25/008 |
| | | | 340/517 |
| 2006/0239545 A1 * | 10/2006 | Tedesco | G08B 13/19673 |
| | | | 707/E17.023 |
| 2007/0222577 A1 | 9/2007 | Wilson et al. | |
| 2011/0161119 A1 | 6/2011 | Collins | |
| 2012/0169487 A1 * | 7/2012 | Poder | B60R 25/102 |
| | | | 340/426.15 |
| 2013/0191270 A1 | 7/2013 | Carragher | |
| 2013/0339065 A1 | 12/2013 | Denning et al. | |
| 2014/0019171 A1 | 1/2014 | Koziol | |
| 2014/0136242 A1 | 5/2014 | Weekes et al. | |
| 2014/0200929 A1 | 7/2014 | Fitzgerald et al. | |
| 2014/0358592 A1 | 12/2014 | Wedig et al. | |
| 2015/0025917 A1 | 1/2015 | Stempora | |
| 2015/0109104 A1 * | 4/2015 | Fadell | G08B 27/005 |
| | | | 340/5.7 |
| 2015/0161738 A1 | 6/2015 | Stempora | |
| 2015/0187014 A1 | 7/2015 | Adams et al. | |
| 2015/0332371 A1 | 11/2015 | Lomas | |
| 2016/0091879 A1 | 3/2016 | Marti et al. | |
| 2017/0061800 A1 * | 3/2017 | Davis | G07B 15/00 |
| 2017/0091870 A1 | 3/2017 | Trainor et al. | |
| 2017/0091871 A1 | 3/2017 | Trainor et al. | |
| 2017/0094376 A1 | 3/2017 | Trainor et al. | |
| 2017/0294091 A1 | 10/2017 | Min et al. | |
| 2018/0035084 A1 | 2/2018 | Swiss et al. | |
| 2018/0218452 A1 | 8/2018 | Guensler et al. | |
| 2020/0134728 A1 | 4/2020 | Vickers | |
| 2020/0320639 A1 | 10/2020 | Shah et al. | |

OTHER PUBLICATIONS

Jan. 6, 2021—(US) Non-Final Office Action—U.S. Appl. No. 16/716,090, 23 Pages.

Jun. 1, 2021—(US) Non-Final Office Action—U.S. Appl. No. 16/716,185, 52 pages.

Feb. 16, 2022—(US) Final Office Action—U.S. Appl. No. 16/716,185, 25 Pages.

Mar. 24, 2022—(US) Notice of Allowance—U.S. Appl. No. 16/716,090, 19 Pages.

Oct. 5, 2022—(US) Final Office Action—U.S. Appl. No. 16/716,185, 18 Pages.

Aug. 24, 2023—(US) Notice of Allowance—U.S. Appl. No. 16/716,090, 70 Pages.

Anquillare M., "Risk-Based Pricing Helps Insurers Find Dollars in the Details," Verisk Analytics Inc., Retrieved from the Internet: URL: https://www.verisk.com/verisk-review/archived-articles/risk-based-pricing-helps-insurers-find-dollars-in-the-details/#, Retrieved on Oct. 12, 2018, 7 pages.

Aziz A., "Pay for Motor Insurance Based on Risk Profile—PIAM," The Edge Markets, The Edge Financial Daily, May 8, 2017 , Retrieved from the Internet: URL: http://www.theedgemarkets.com/article/pay-motor-insurance-based-risk-profile-%E2%80%94-piam, Retrieved on Oct. 2, 2018, 10 pages.

"Finding Insurance, Insider Information: How Insurance Companies Measure Risk," Insurance Company.com, Retrieved from the Internet: URL: http://www.insurancecompanies.com/insider-information-how-insurance-companies-measure-risk/, Retrieved on Oct. 12, 2018, 11 pages.

Fisher T., "Social Media Intelligence and Profiling in the Insurance Industry," Medium, Retrieved from the Internet: URL: https://medium.com/privacy-international/social-media-intelligence-and-profiling-in-the-insurance-industry-4958fd11f86f, Retrieved on Oct. 12, 2018, 12 pages.

"Insurance Risk Management," Kish Protection & Indemnity Club, Retrieved from the Internet: URL: http://www.kishpandi.com/covers/insurance-risk.html, Retrieved on Oct. 12, 2018, 4 pages.

Office of Policy Development and Research, Neighborhoods and Violent Crime, Summer 2016, see p. 6.

Pandey K.K., "Risk Management in General Insurance Business in India," The IUP Journal of Financial Risk Management, vol. 10 (3), Jul. 2013, Retrieved from the Internet: URL: https://www.iupindia.in/1309/Financiai%20Risk%20Management/Risk _ Management_inGeneral_Insurance.html, Retrieved on Oct. 12, 2018, pp. 62-82.

* cited by examiner

300

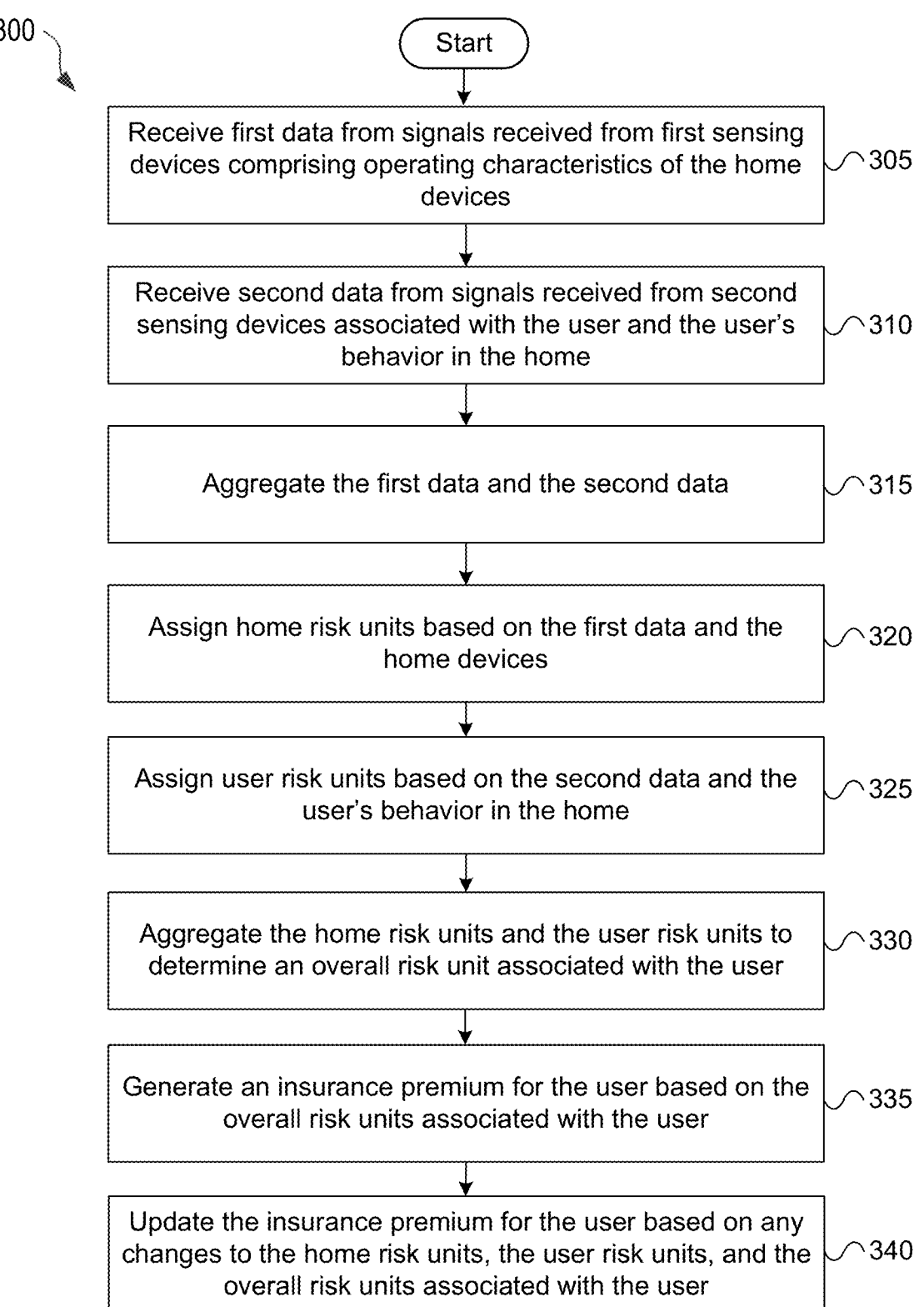

Start

Receive first data from signals received from first sensing devices comprising operating characteristics of the home devices — 305

Receive second data from signals received from second sensing devices associated with the user and the user's behavior in the home — 310

Aggregate the first data and the second data — 315

Assign home risk units based on the first data and the home devices — 320

Assign user risk units based on the second data and the user's behavior in the home — 325

Aggregate the home risk units and the user risk units to determine an overall risk unit associated with the user — 330

Generate an insurance premium for the user based on the overall risk units associated with the user — 335

Update the insurance premium for the user based on any changes to the home risk units, the user risk units, and the overall risk units associated with the user — 340

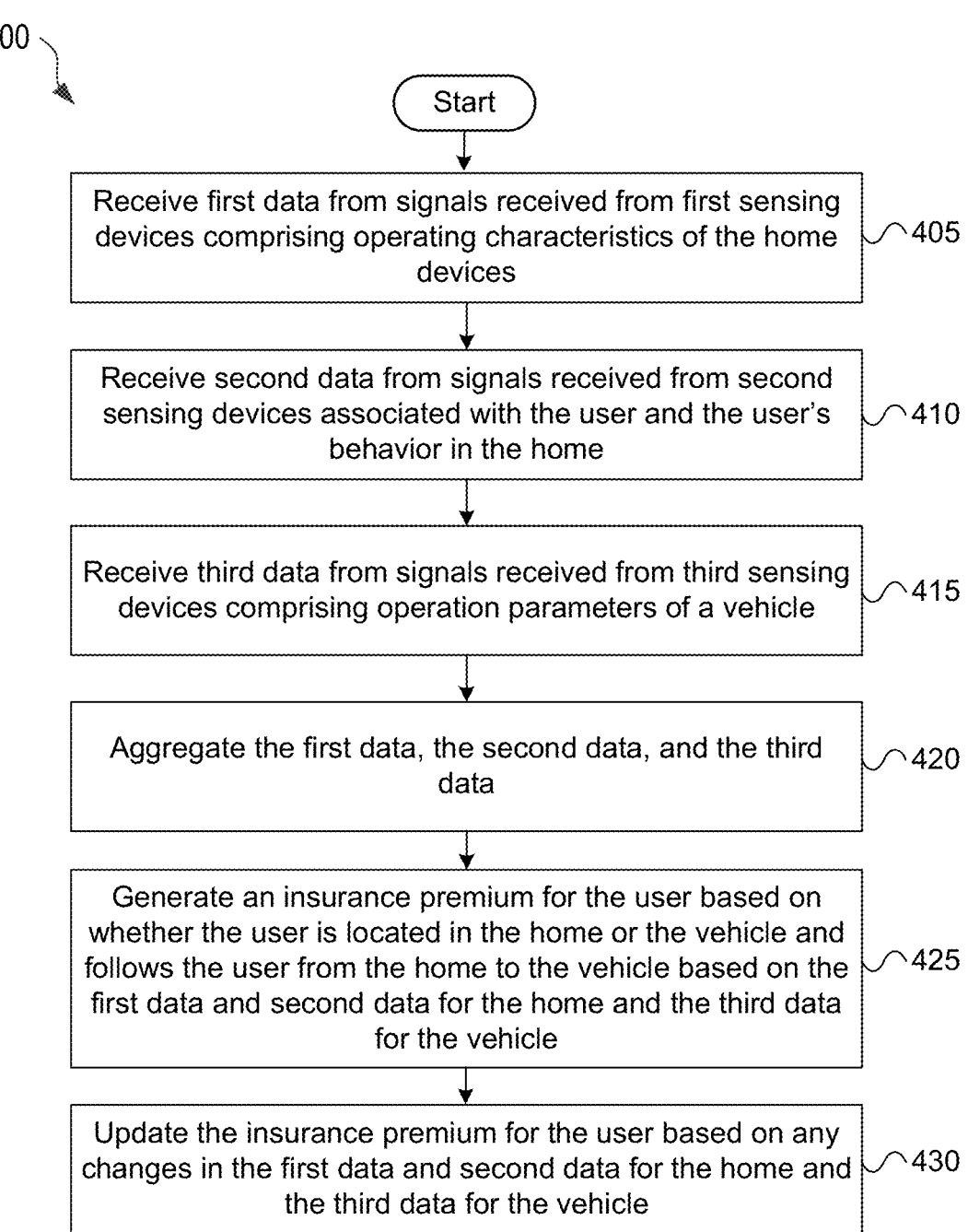

Start

Receive first data from signals received from first sensing devices comprising operating characteristics of the home devices ⟿405

Receive second data from signals received from second sensing devices associated with the user and the user's behavior in the home ⟿410

Receive third data from signals received from third sensing devices comprising operation parameters of a vehicle ⟿415

Aggregate the first data, the second data, and the third data ⟿420

Generate an insurance premium for the user based on whether the user is located in the home or the vehicle and follows the user from the home to the vehicle based on the first data and second data for the home and the third data for the vehicle ⟿425

Update the insurance premium for the user based on any changes in the first data and second data for the home and the third data for the vehicle ⟿430

Figure 5:
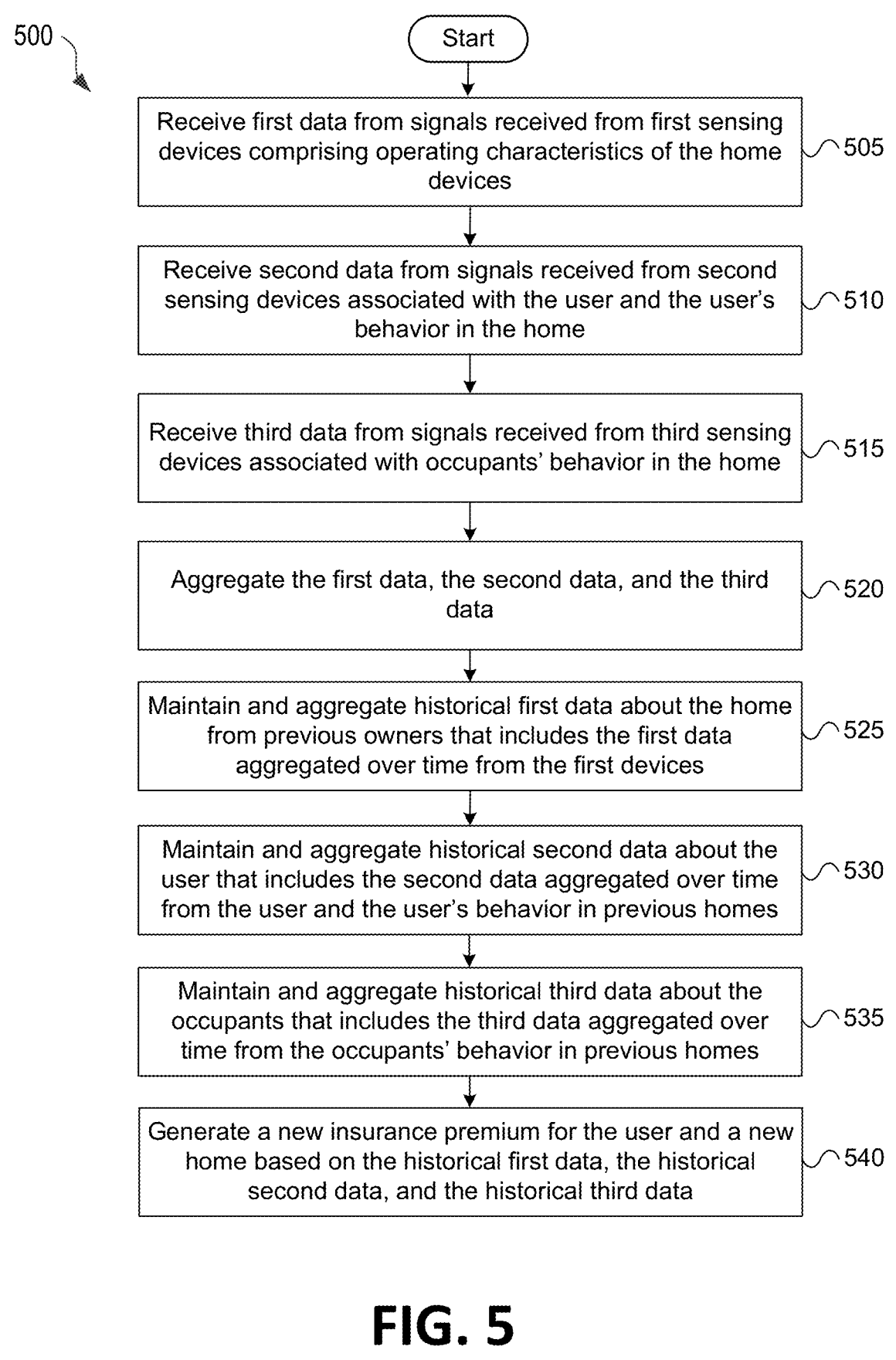

Start

Receive first data from signals received from first sensing devices comprising operating characteristics of the home devices — 505

Receive second data from signals received from second sensing devices associated with the user and the user's behavior in the home — 510

Receive third data from signals received from third sensing devices associated with occupants' behavior in the home — 515

Aggregate the first data, the second data, and the third data — 520

Maintain and aggregate historical first data about the home from previous owners that includes the first data aggregated over time from the first devices — 525

Maintain and aggregate historical second data about the user that includes the second data aggregated over time from the user and the user's behavior in previous homes — 530

Maintain and aggregate historical third data about the occupants that includes the third data aggregated over time from the occupants' behavior in previous homes — 535

Generate a new insurance premium for the user and a new home based on the historical first data, the historical second data, and the historical third data — 540

Figure 6:
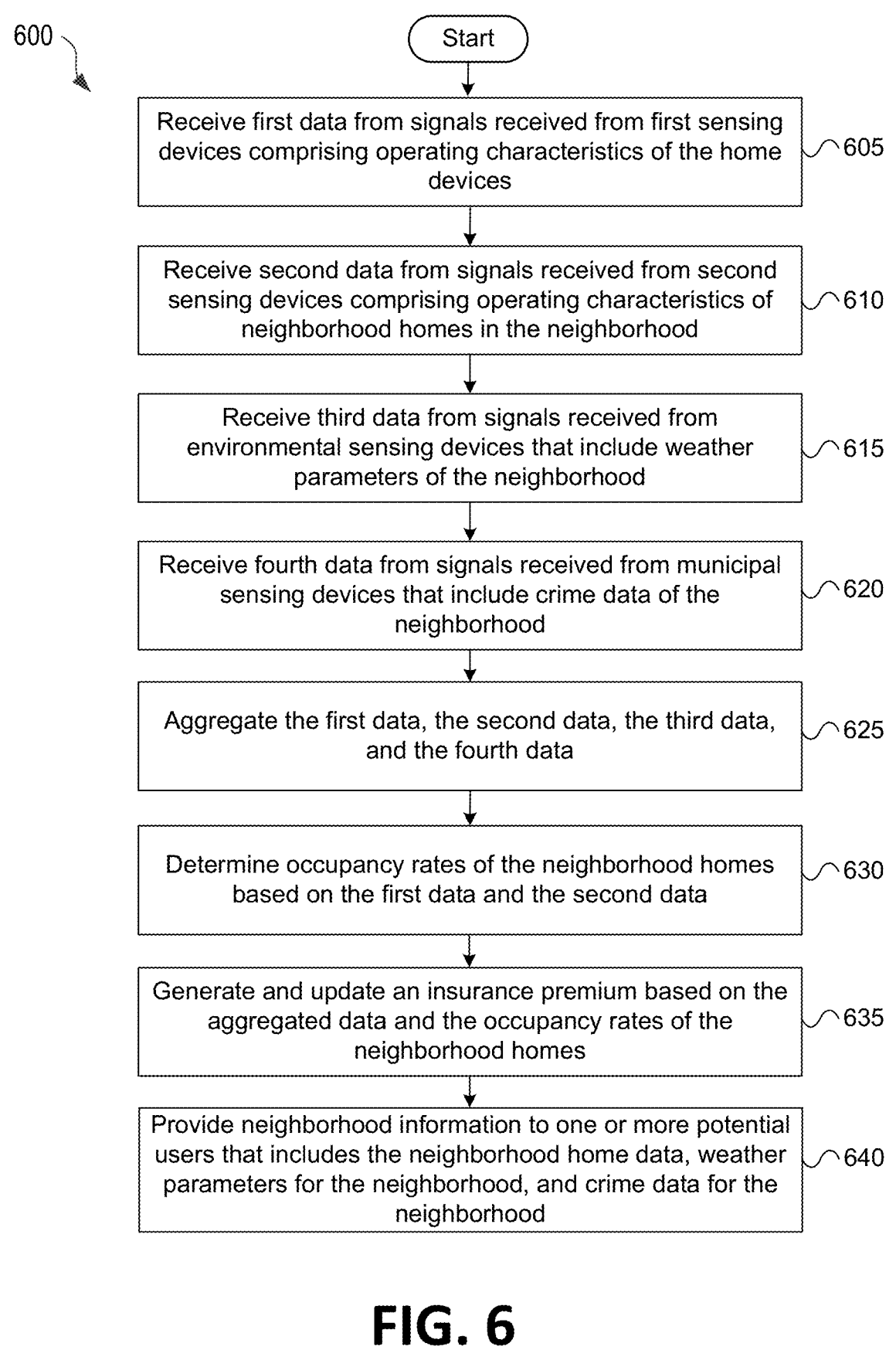

Start

Receive first data from signals received from first sensing devices comprising operating characteristics of the home devices ~605

Receive second data from signals received from second sensing devices comprising operating characteristics of neighborhood homes in the neighborhood ~610

Receive third data from signals received from environmental sensing devices that include weather parameters of the neighborhood ~615

Receive fourth data from signals received from municipal sensing devices that include crime data of the neighborhood ~620

Aggregate the first data, the second data, the third data, and the fourth data ~625

Determine occupancy rates of the neighborhood homes based on the first data and the second data ~630

Generate and update an insurance premium based on the aggregated data and the occupancy rates of the neighborhood homes ~635

Provide neighborhood information to one or more potential users that includes the neighborhood home data, weather parameters for the neighborhood, and crime data for the neighborhood ~640

Figure 7:
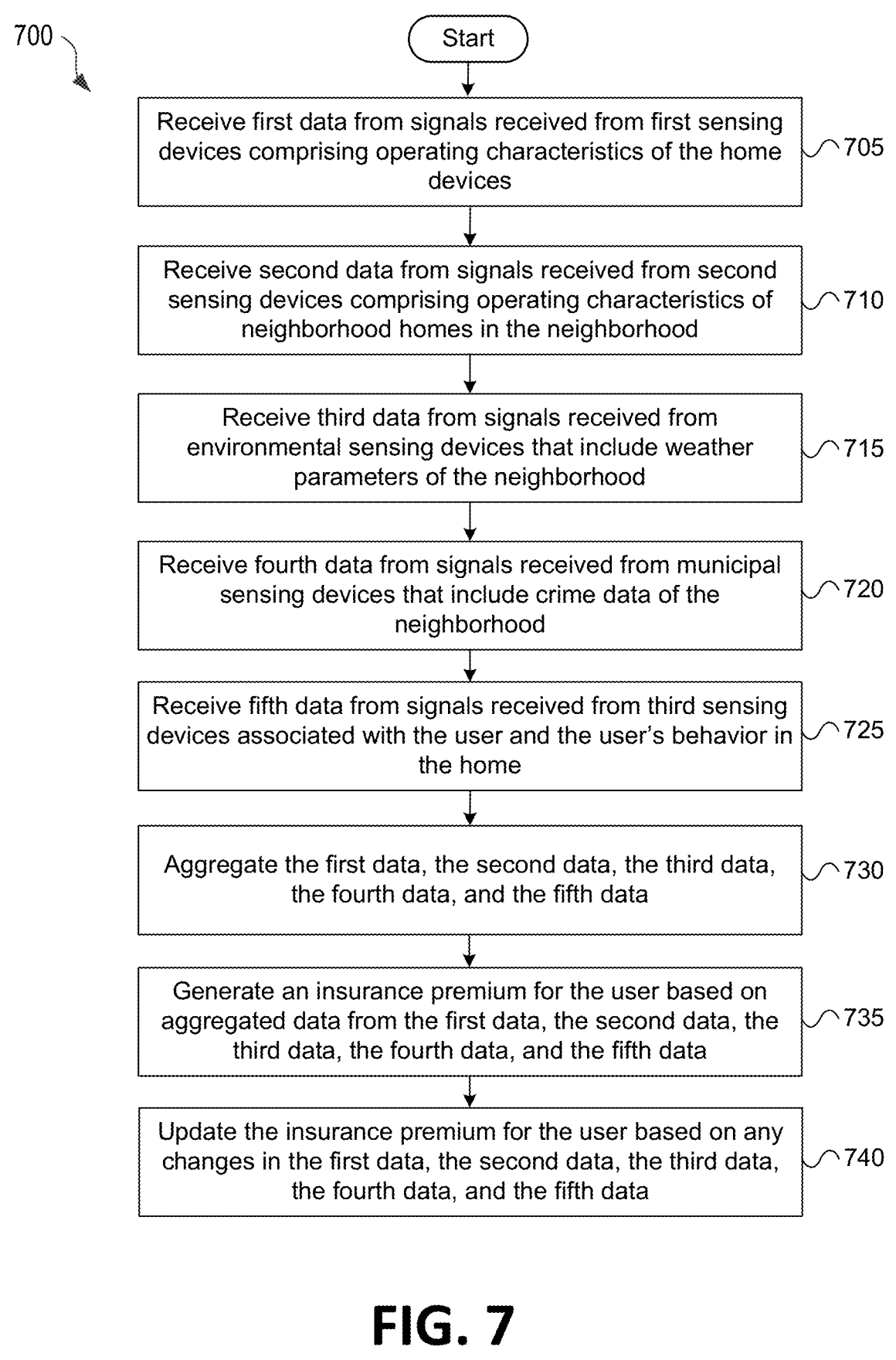

( Start )

Receive first data from signals received from first sensing devices comprising operating characteristics of the home devices — 705

Receive second data from signals received from second sensing devices comprising operating characteristics of neighborhood homes in the neighborhood — 710

Receive third data from signals received from environmental sensing devices that include weather parameters of the neighborhood — 715

Receive fourth data from signals received from municipal sensing devices that include crime data of the neighborhood — 720

Receive fifth data from signals received from third sensing devices associated with the user and the user's behavior in the home — 725

Aggregate the first data, the second data, the third data, the fourth data, and the fifth data — 730

Generate an insurance premium for the user based on aggregated data from the first data, the second data, the third data, the fourth data, and the fifth data — 735

Update the insurance premium for the user based on any changes in the first data, the second data, the third data, the fourth data, and the fifth data — 740

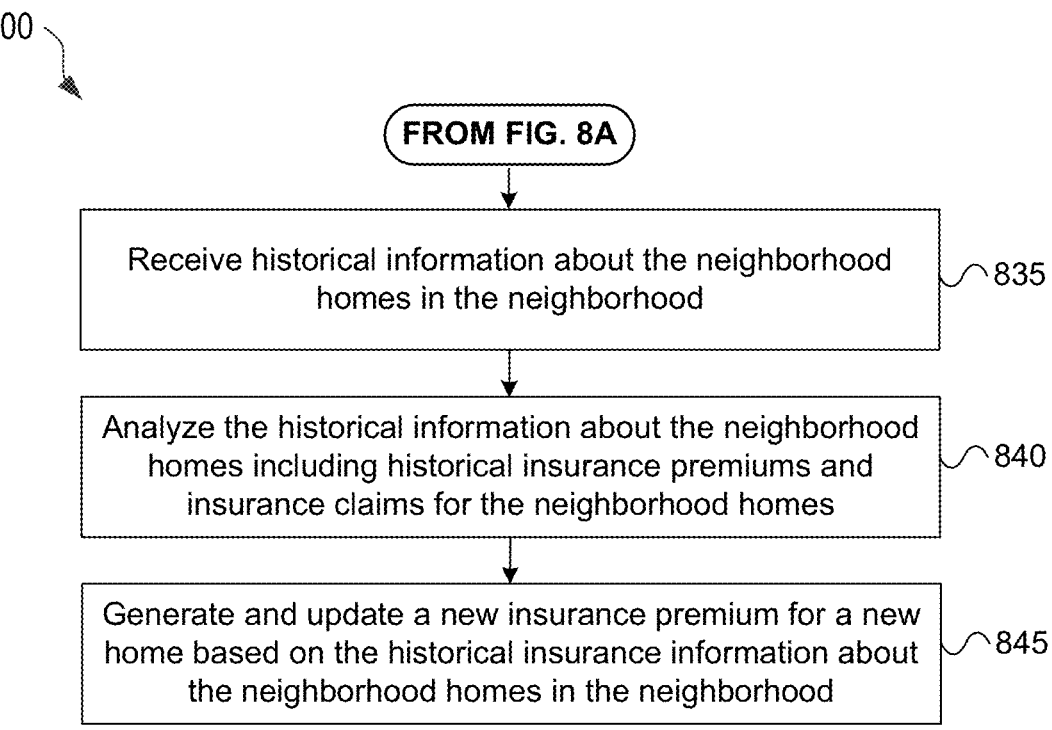

FROM FIG. 8A

Receive historical information about the neighborhood homes in the neighborhood          835

Analyze the historical information about the neighborhood homes including historical insurance premiums and insurance claims for the neighborhood homes          840

Generate and update a new insurance premium for a new home based on the historical insurance information about the neighborhood homes in the neighborhood          845

FIG. 8B

CONNECTED HOME SYSTEM WITH RISK UNITS

CROSS-REFERENCE TO RELATED APPLICATIONS

This application is a continuation of and claims priority to U.S. Non-Provisional patent application Ser. No. 16/716,090 filed on Dec. 16, 2019, entitled CONNECTED HOME SYSTEM WITH RISK UNITS, which claims priority to U.S. Provisional Patent Application No. 62/779,798, filed Dec. 14, 2018, each of these applications is incorporated by reference in its entirety herein.

FIELD OF THE INVENTION

The present invention relates to various systems and methods that collect and analyze information from connected devices in a home to determine risk, determine rating plans, or generate risk scores from the collected data.

BACKGROUND

People are often looking for ways to protect their homes. People buy insurance for exactly that reason—to protect against unforeseen risks. In conventional arrangements, it may be difficult or impossible to know when a failure of a home device may occur that may lead to damage to the home, an insurance claims etc. In addition, homes located in the same neighborhood may be exposed to similar risks such as damage from weather events or neighborhood crime. For example, roof damage from a storm event on one home in a neighborhood may indicate potential damage of other roofs of homes in the same neighborhood. Without accurate information associated with a particular home or neighborhood of homes an insurance company might not be able to accurately assess neighborhood risk and the impact of such risk. This may result in an insurance premium that is based on a generic risk assessment, rather than a risk assessment tailored to the specific home in a specific neighborhood.

SUMMARY

Aspects of the disclosure generally relate to monitoring and/or sensing of one or more home devices from one or more homes. In particular, various aspects described herein relate to receiving data from one or more sensors associated with one or more home devices from one or more homes and using the data to determine insurance rates or premiums, discounts, incentives, and the like.

Further, aspects of the disclosure relate to computer hardware and software. In particular, one or more aspects of the disclosure relate to the connected home or smart home market (i.e. connected devices and systems within or related to the home) which is rapidly evolving and growing.

According to an embodiment, a connected home system may comprise a processing unit comprising a processor; and a memory unit storing computer-executable instructions, which when executed by the processing unit, cause the connected home system to: receive first data from signals received from one or more first sensing devices; receive second data from signals received from one or more second sensing devices; aggregate the first data and the second data; assign in real-time one or more home risk units based on the first data and the one or more home devices in the home; assign in real-time one or more user risk units based on the second data associated with the user and user's behavior in the home; aggregate in real-time the home risk units and the user risk units to determine an overall risk units associated with the user; generate an insurance premium for the user based on the overall risk units associated with the user; and update in real-time the insurance premium for the user based on any changes to the home risk units, the user risk units, and the overall risk units associated with the user. The one or more first sensing devices may be in communication with a digital network in a home and one or more home devices associated with a user. The first data may comprise operating characteristics of the one or more home devices. The one or more second sensing devices may in communication with the digital network in the home and the second data associated with the user and user's behavior in the home.

In further aspects, the connected home system may include the following features. The first data may include one or more of the following: kilowatt hours used, gallons of water flowing into the home, sump pump usage, amount of natural gas used, or an average temperature in the home. The second data may include one or more of the following: megabytes of data flowing through a router of the digital network, number of times a garage door opens and closes, number of time a front door opens and closes, amount of time an alarm system is activated, or loads of dishes/laundry done. Further, the connected home system may: receive third data from signals received from third sensing devices comprising operation parameters of a vehicle; aggregate in real-time the first data, the second data, and the third data; and update in real-time the insurance premium for the user, wherein the insurance premium is adjusted in real-time based on whether the user is located at the home or the vehicle, and the updated insurance premium is based on the first data and the second data for the home and the third data for the vehicle. Additionally, the connected home system may: maintain and aggregate historical first data about the home from previous owners that includes the first data aggregated over time from the first sensing devices; maintain and aggregate historical second data about the user that includes the second data aggregated over time from the user and the user's behavior in previous homes; and generate a new insurance premium for the user and a new home based on the historical first data. Further, the insurance premium may include a coverage amount for a cost of coverage and a preventative amount for one or more preventative tasks for the home based on the first data and operating characteristics of the one or more home devices. Additionally, the connected home system may provide and integrate a digital safety program based on the first data and the operating characteristics of the one or more home devices and the second data associated with the user and user's behavior in the home.

According to another embodiment, a method for a connected home system, may comprise the following steps: receiving first data from signals received from one or more first sensing devices, the one or more first sensing devices being in communication with a digital network in a home and one or more home devices associated with a user, the first data comprising operating characteristics of the one or more home devices; receiving second data from signals received from one or more second sensing devices, the one or more second sensing devices in communication with the digital network in the home and the second data associated with the user and user's behavior in the home; aggregating the first data and the second data; assigning in real-time one or more home risk units based on the first data and the one or more home devices in the home; assigning in real-time one or more user risk units based on the second data associated with the user and user's behavior in the home; aggregating in real-time the home risk units and the user risk units to determine an overall risk units associated with the user; generating an insurance premium for the user based on the overall risk units associated with the user; and updating the insurance premium for the user based on any changes to the home risk units, the user risk units, and the overall risk units associated with the user.

According to yet another embodiment, one or more non-transitory, computer-readable media storing instructions that, when executed by a computing device, may cause the computing device to: receive first data from signals received from one or more first sensing devices, the one or more first sensing devices being in communication with a digital network in a home and one or more home devices associated with a user, the first data comprising operating characteristics of the one or more home devices and including one or more of the following: kilowatt hours used, gallons of water flowing into the home, sump pump usage, amount of natural gas used, or an average temperature in the home; receive second data from signals received from one or more second sensing devices, the one or more second sensing devices in communication with the digital network in the home and the second data associated with the user and user's behavior in the home and including one or more of the following: megabytes of data flowing through a router of the digital network, number of times a garage door opens and closes, number of time a front door opens and closes, amount of time an alarm system is activated, or loads of dishes/laundry done;

aggregate the first data and the second data; assign in real-time one or more home risk units based on the first data and the one or more home devices in the home; assign in real-time one or more user risk units based on the second data associated with the user and user's behavior in the home; aggregate in real-time the home risk units and the user risk units to determine an overall risk units associated with the user; generate an insurance premium for the user based on the overall risk units associated with the user; and update in real-time the insurance premium for the user based on any changes to the home risk units, the user risk units, and the overall risk units associated with the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 provides a flow chart illustrating one example method of implementing a connected home system with risk units that may be used to implement the processes and functions of certain aspects of the present disclosure;

FIG. 4 provides a flow chart illustrating one example method of implementing a connected home system for an insurance plan that follows a user from a home to a vehicle that may be used to implement the processes and functions of certain aspects of the present disclosure;

FIG. 5 provides a flow chart illustrating one example method of implementing a connected home system for an insurance plan for a home based on historical information over time that may be used to implement the processes and functions of certain aspects of the present disclosure;

FIG. 6 provides a flow chart illustrating one example method of implementing a connected home system for an insurance plan based on neighborhood occupancy data that may be used to implement the processes and functions of certain aspects of the present disclosure;

FIG. 7 provides a flow chart illustrating one example method of implementing a connected home system for an insurance plan based on user behavior data, home data, neighborhood home data, weather data of the neighborhood, and crime data of the neighborhood that may be used to implement the processes and functions of certain aspects of the present disclosure; and FIGS. 8A and 8B provide a flow chart illustrating one example method of implementing a connected home system that may be used to implement the processes and functions of certain aspects of the present disclosure.

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The connected home systems and methods as described and disclosed may be used for one or more of the following capabilities or features: transferring insurance coverage for a user from an auto to a home based on the location of the user; improving digital security for user data within the connected home; pricing insurance based on analyzing the data passing through a home router and the behavior of the users within and around the home; using geographic territories and neighborhood scoring in pricing home insurance; determining a roof condition based on sensor data collected within the home; and pricing insurance policies to include a portion directed to a premium and a portion directed to performing preventative maintenance tasks.

Figure 1:
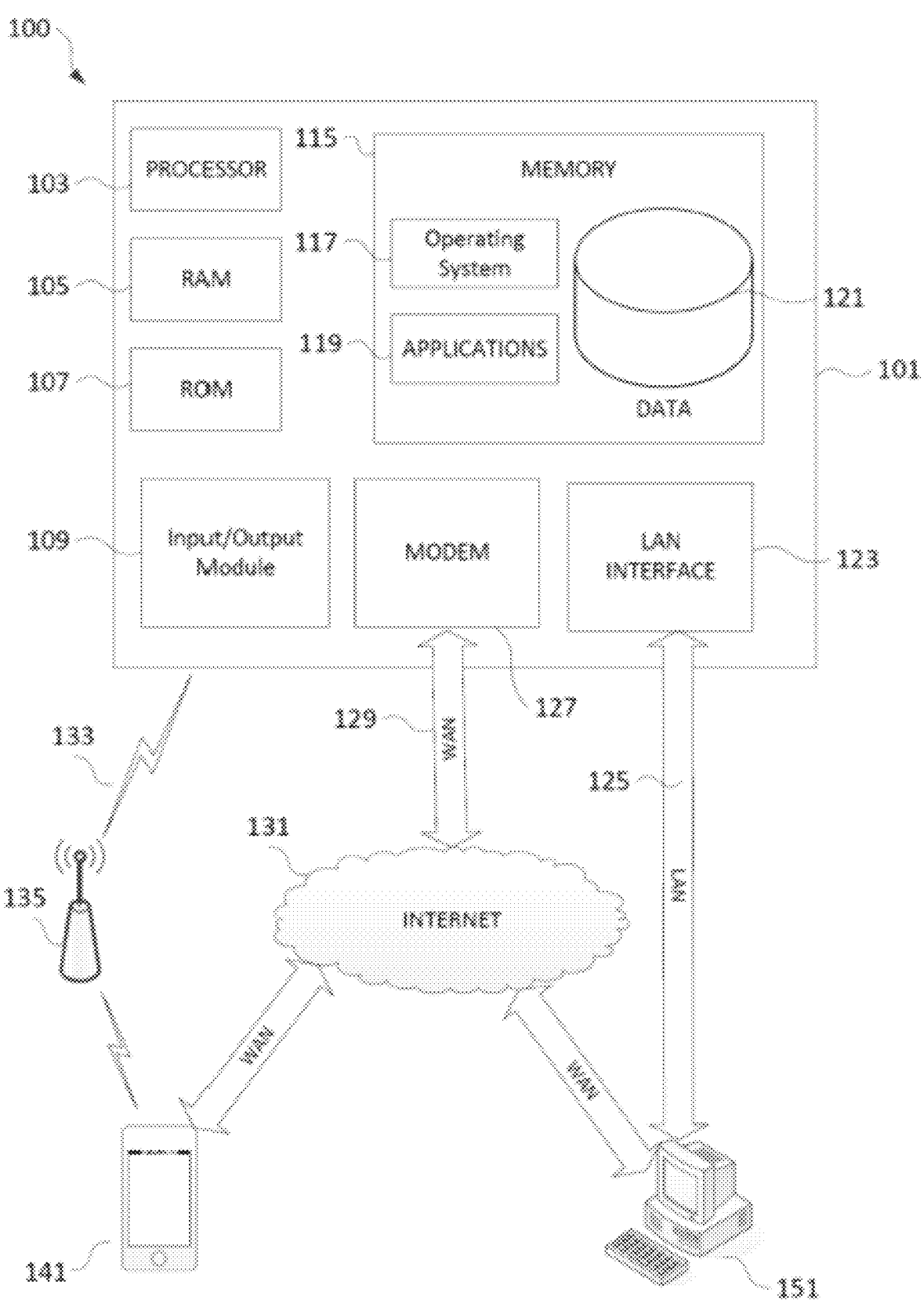
FIG. 1 illustrates a network environment and computing systems that may be used to implement aspects of the disclosure.

FIG. 1 illustrates a block diagram of a connected home sensing device (or system) 101 in a connected home network environment 100 that may be used according to one or more illustrative arrangements of the disclosure. The connected home sensing device/system 101 may have a processor 103 for controlling overall operation of the connected home sensing device/system 101 and its associated components, including RAM 105, ROM 107, input/output device 109, and memory 115. The connected home sensing device/ system 101, along with one or more additional devices (e.g., terminals 141, 151) may correspond to any of multiple systems or devices, such as various servers or systems, such as a system or systems for sensing and/or monitoring aspects of one or more home devices, such as a system or systems integrated within home devices and for sensing and/or monitoring aspects of one or more home devices, system or systems for determining a home profile or neighbored rating factor, system or systems for sensing and/or monitoring aspects of a home owner's behavioral habits, and the like, configured as described herein for receiving data associated with one or more home devices, one or more home appliances or smart devices, one or more health or lifestyle aspects, etc., to determine whether the operation of these devices is within an acceptable range, identify any potential issues or failures, identify or adjust insurance rates based on the received data, provide insurance incentives for improvement based on the data, etc. Such system or systems may communicate any sensed or determined data to other users for alerting them to current conditions to take preventive action.

Input/Output (I/O) 109 may include a microphone, keypad, touch screen, cameras, sensors, and/or stylus through which a user of the connected home sensing device/system 101 may provide input, and may also include one or more of a speaker for providing audio output and a video display device for providing textual, audiovisual and/or graphical output. Software may be stored within memory 115 and/or storage to provide instructions to processor 103 for enabling the connected home sensing device/system 101 to perform various functions. For example, memory 115 may store software used by the connected home sensing device/system 101, such as an operating system 117, application programs 119, and an associated internal database 121. Processor 103 and its associated components may allow the connected home sensing device/system 101 to execute a series of computer-readable instructions to receive data associated with a home device, home appliances, smart devices, vehicle, lifestyle aspect, etc., determine one or more aspects of operation of the device and/or one or more overall aspects of a customer's lifestyle and/or provide insurance rates and/or incentives based on the data.

The connected home sensing device/system 101 may operate in a connected home network environment 100 supporting connections to one or more remote computers, such as terminals 141 and 151. The terminals 141 and 151 may be personal computers, servers (e.g., web servers, database servers), or mobile communication devices (e.g., mobile phones, portable computing devices, and the like), and may include some or all of the elements described above with respect to the connected home sensing device/system 101. The network connections depicted in FIG. 1 include a local area network (LAN) 125 and a wide area network (WAN) 129, and a wireless telecommunications network 133, but may also include other networks, such as Bluetooth®, ZigBee®, or Z-Wave®. When used in a LAN networking environment, the connected home sensing device/system 101 may be connected to the LAN 125 through a network interface or adapter 123. When used in a WAN networking environment, the connected home sensing device/system 101 may include a modem 127 or other means for establishing communications over the WAN 129, such as network 131 (e.g., the Internet). When used in a wireless telecommunications network 133, the connected home sensing device/system 101 may include one or more transceivers, digital signal processors, and additional circuitry and software for communicating with wireless computing devices 141 (e.g., mobile phones, portable computing devices, appliances, smart devices, and other connected home devices within the home and the like) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, WiMAX, and wireless mesh networks, is presumed, and the various computing devices and system components described herein may be configured to communicate using any of these network protocols or technologies.

Additionally, one or more application programs 119 used by the connected home sensing device/system 101 may include computer-executable instructions (e.g., home device characteristic data analysis, home profile data etc.) for receiving data associated with a home device of a user, analyzing the data to determine one or more aspects of the home device, and/or generating insurance rate, adjustment, incentive, etc. based on the data. Furthermore, one or more application programs 119 used by the connected home sensing device/system 101 may include computer-readable instructions for determining a home profile or neighborhood rating factor which may be used to adjust insurance premiums. The application programs 119 may also be used to communicate any sensed or determined data to other users for alerting them to current conditions so that they can take preventive action. The application program 119 may also be used to assist in preventing fraudulent claims.

Additionally or alternatively, one or more application programs 119 used by the connected home sensing device/ system 101 may include computer-executable instructions (e.g. home device, vehicle and/or lifestyle data analysis, etc.) for receiving data associated with one or more aspects of a home device of a user, one or more aspects of a vehicle and/or driving characteristics of the user, and/or one or more aspects of the lifestyle of the user. The data may, in some examples, be used to identify insurance rates, adjustments, incentives, and the like.

The systems described herein may be used by an insurance company, financial institution or other entity to monitor one or more home devices, vehicles, driving characteristics, lifestyle characteristics, etc. of a home and a user. Although many examples herein will be described as being used in conjunction with an insurance company, the systems and methods described herein may be used by or with other entities or types of entities without departing from the invention.

Figure 2A:
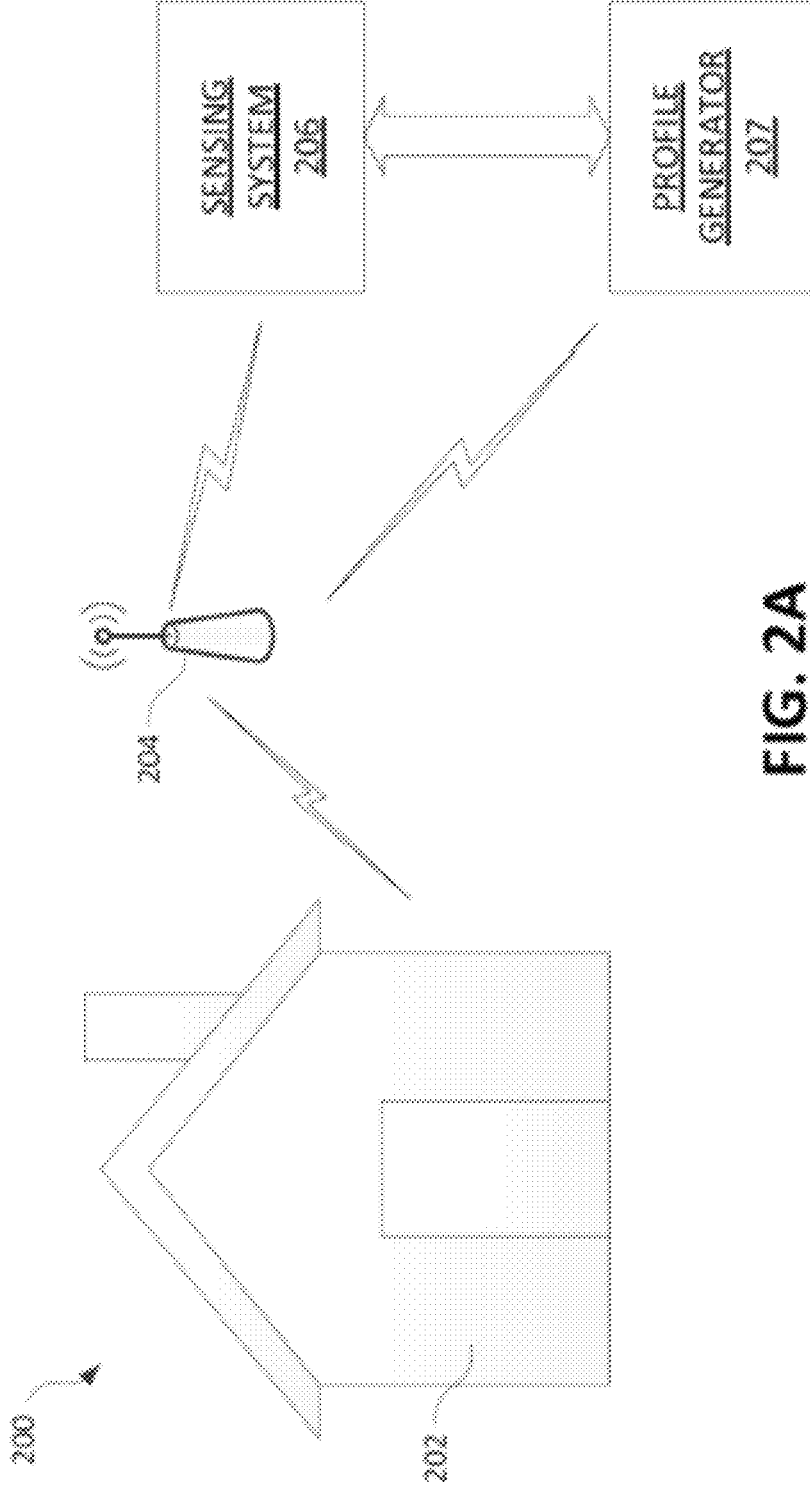
FIG. 2A is a schematic diagram of an example system according to one or more aspects described herein.
Figure 2B:
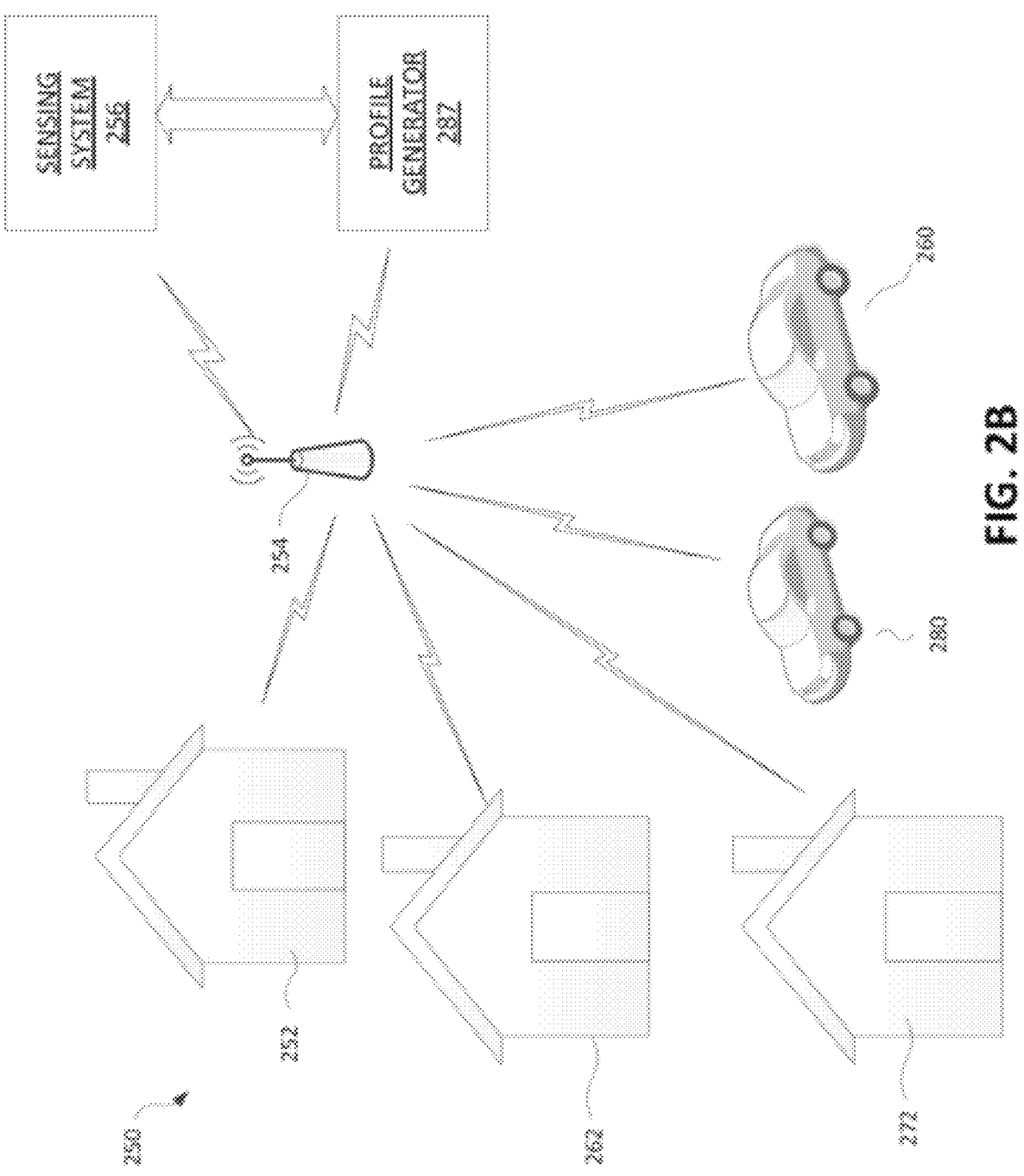
FIG. 2B is a schematic diagram of another example system according to one or more aspects described herein.

In some arrangements, a sensing or monitoring system may be implemented by an entity. In some examples, the entity may be an insurance company. FIGS. 2A and 2B are schematic illustrations of sensing and/or connected home system 200 according to one or more aspects described herein. As shown in FIG. 2A, the connected home system 200 may include a home 202. The home generally includes a variety of systems, appliances, devices, etc. that may be monitored by one or more sensing systems described herein. For instance, one or more sensors or sensing devices may be arranged on or integrated into appliances and/or devices such as hot water heaters, refrigerators, ovens, stoves, washing machines, dryers, dishwashers, furnaces, air conditioning units, routers, smart devices, connected electronics, smart televisions, smart cable boxes, computers, smart lighting, smart speakers, smart locking systems, smart thermostats, alarm systems, and cameras, and the like. In some examples, sensors or other monitoring devices may be arranged on or integrated into paint, bricks or other building materials, and the like. Other home devices may include sensors or be monitored without departing from the invention.

In some examples, various types of sensors may be used with the sensing and/or monitoring system. For instance, power sensors, water sensors, heat or smoke sensing devices, and the like, may be used. In still other examples, "smart" materials may be used, such as smart paints, smart bricks, and the like, that may provide indications of wear or potential failure.

The home 202 depicted in FIG. 2A may include a plurality of appliances or devices and/or systems and one or more of the appliances and/or systems (e.g., devices) may be monitored by one or more sensing devices, as will be described more fully below. Signals from the one or more sensing devices may be transmitted to a connected home sensing system 206 at an entity, such as an insurance company. In some examples, the signals may be wirelessly transmitted and may be transmitted to a base collection unit 204 prior to transmission to the connected home sensing system 206. Alternatively, the signals may be transmitted directly to the connected home sensing system 206, e.g., via wired or wireless means. In some arrangements, the data may be collected in real-time and/or transmitted in real-time or near real-time. Additionally or alternatively, the data may be collected and/or transmitted in batches. In some examples, the home sensing system 206 may be located at the home for aggregation and/or processing and transmission to the entity or insurance company.

In an aspect of the disclosure, the connected home sensing system 206 may log the time of day that events occur such as the time lights are turned on, doors are opened and closed, and the like. In addition, the connected home sensing system 206 may log activation times of appliances such as logging the starting time of an oven, stove or dishwasher. The time the appliance turns off may also be logged such that a duration time may be calculated for each appliance. In an embodiment, the connected home sensing system 206 may also log the opening and closing of doors or windows and the activation of security systems or the like.

In an aspect of the disclosure, the connected home sensing system 206 may transmit the stored information to a connected home profile generator 207 to determine a connected home profile for home 202. The determined connected home profile may include typical operations of home 202 such as appliance use, opening and closing of doors and windows, and activation of lights. In an embodiment, the connected home profile generator 207 may analyze data from the various home-sensing devices. The connected home profile generator 207 may determine based on analysis of hours or days of sensor data normal usage patterns for the home and/or the appliances found in the home. The determined normal usage patterns for the home may be used to generate a connected home profile for the home.

In an embodiment, a connected home profile may comprise a series of scores described and detailed in this specification. The connected home profile may be determined based on losses associated with various perils. In an embodiment, various perils that may be scored include fire, brush fire, weather water, non-weather water, liability, theft, wind, hail, lightning, hurricane, and a miscellaneous category that captures new or risks not categorized above. Those skilled in the art will realize that additional categories or grouping of perils may be added based on property location or other external factors. In an embodiment, sensor data may be tied to various peril categories for which losses may occur. For example, use or non-use of an alarm system may be used to determine losses or potential losses for the theft peril. In another embodiment, sensors measuring appliance and/or utility usage may be used to determine losses or potential losses for the fire peril. Those skilled in the art will realize that sensor data from each monitored device may be applied to multiple different perils.

In an aspect of the disclosure, factors may be determined for each of the peril categories based at least in part on sensor data and/or normal operating conditions of the home. In an embodiment, the connected home profile may comprise a series of scores based one the calculated factors. The calculated connected home profile may be applied to each of the peril categories to determine an insurance premium rate.

In an aspect of the invention, a connected home profile may comprise an overall rating score. The overall rating score may be determined at least in part by the number of sensors located in the home and the number of sensor activations. The connected home profile may also comprise, in part, the determined normal operating conditions of the home. In an aspect of the invention, the connected home profile may be calculated along a sliding scale ranging in one embodiment between zero and five hundred. Those skilled in the art will realize that numerous other sliding scales with various ranges may also be used. In an embodiment, the home profile may be applied to each of the peril categories to determine an insurance premium rate. In an aspect of the invention, the connected home profile may apply differently to each of the various perils to determine an insurance premium rate.

In an aspect of the invention, the determined connected home profile for the home may be used for determining an insurance premium rate for the home. In an aspect of the disclosure, the determined connected home profile may be updated at some frequency by automatic review of new sensor data over a specified time period.

In another aspect of the invention, the connected home sensing system 206 may include a plurality of cameras, sensors, or systems that are capable of recognizing people with artificial intelligence (AI), such as speech recognition, image recognition, face scanning, computer vision, or machine learning. For example, the plurality of cameras or sensors with AI may recognize a person walking in a home, entering the home, or walking around the home.

FIG. 2B illustrates another example sensing arrangement 250. Similar to the arrangement of FIG. 2A, the arrangement 250 of FIG. 2B includes a home 252 that may include a plurality of appliances and/or systems that may be monitored by one or more sensing devices. In addition, the arrangement 252 may include a vehicle 260. The vehicle 260 may include one or more sensing devices configured to monitor driving habits of a user. The data associated with the vehicle 260 may be transmitted to a sensing system 256, e.g., via wired or wireless communications. For instance, vehicle 260 may include one or more cameras and proximity sensors capable of recording additional conditions inside or outside of the vehicle. Internal cameras may detect conditions such as the number of the passengers in the vehicle and potential sources of driver distraction within the vehicle (e.g., pets, phone usage, unsecured objects in the vehicle). External cameras and proximity sensors may detect other nearby vehicles, traffic levels, road conditions, traffic obstructions, animals, cyclists, pedestrians, and other conditions that may factor into a driving event data analysis. The external cameras and sensors may also be used to detect ambient conditions or weather events when parked such as in a home driveway. In addition, the vehicle sensors may detect motion around the vehicle parked at the home. Sensors on the car may also be able to detect or record a burglary in progress or other event occurring in view of the external cameras or sensors. The data may be transmitted to sensing system 256. In another embodiment, the operational sensors and the cameras and proximity sensors may store data within the vehicle, and/or may transmit the data to one or more external computer systems, as will be discussed more fully below.

The data transmitted to the sensing system 256 may be aggregated and some or all of the portions of the data may be used to identify and/or adjust insurance premiums or rates, provide insurance incentives, and/or provide discounts to the user. For instance, a user may be eligible for a discounted insurance premium if the user is willing to share the monitored or collected data with an entity, such as an insurance company. This data may then be used to modify or set insurance premiums or rates for the user (e.g., home insurance, vehicle insurance, and the like) and/or to more accurately assess risk associated with a user. Additionally or alternatively, the data collected may be aggregated with other data (e.g., historical data collected over an extended time period, other user monitored data, etc.) to further assess risk and/or set premiums or rates. The aggregated data may, in some examples, be sorted by locality (e.g., neighborhood, township, state, etc.) to assess risk by geographic location and set or adjust premiums or rates based on geographic location, as desired. In addition, portions of the data may also be shared with other homes in the same neighborhood. For instance, FIG. 2B illustrates additional homes 262 and 272 which along with home 252 may comprise homes in a common neighborhood. The neighborhood may be defined by a number of particular streets or addresses or even by zip codes. Homes located within the same neighborhood may share information in order to notify each other of present events. For example, if home 250 determines based on the sensor data that a burglary may be ongoing, a message may be transmitted to home 262 and home 272 to alert them to the potential danger and to have them take preventive measures such as turning on all exterior lights. In an embodiment, homes willing to share such data with an entity and with other homes may be eligible for discounted insurance premiums or other incentives.

FIG. 2B further illustrates an additional vehicle 280 which may also be associated with a particular home such as home 272. Vehicle 280 similar to vehicle 260 may transmit information to a base collection unit 254 or directly to a sensing system 256, such as a sensing system used by an entity (e.g., an insurance company or provider). Vehicle data 280 along with home data 272 and 262 may be used or aggregated to determine or adjust the insurance premiums or rates of the individual homes. In another embodiment, vehicle data 280 along with home data 272 and 262 may be used or aggregated to determine a neighborhood rating factor to be applied to the insurance premiums or rates of multiple homes within a neighborhood.

Generally, a connected home sensing system 206 may include various analysis and data that provides an abundance of data and information. Micro-insurance or micromanaged insurance can be utilized to analyze and utilize this abundance of data and information from the connected home sensing system 206. This micro-insurance can also be referred to as block-chain based.

In an aspect of this invention, home insurance may turn on when the homeowner comes home and turn off when the homeowner leaves the home. In another aspect, home insurance may have different levels based on the predicted lifestyle and behaviors of the customer. For example, if the homeowner is not at the home, but a nanny is with the children, a nanny insurance may be utilized. A "swipe-on/swipe-off" insurance may be utilized based on the circumstances and situation of the homeowner. For example, insurance may turn on to a certain level when the home owner is home, and theft insurance may go down, but an occupancy insurance may go up to a different level based on the home owner being home. When the homeowner leaves, the theft insurance may go up and the occupancy insurance goes down based on the homeowner not being present at the home. In another example, insurance may also vary not just on the type of occupant or person, but also on the individual person and their behavior based on an individual profile for individual occupants that is developed through the plurality of cameras or sensors with AI. One occupant may be home all week while another occupant travels. The person at home may leave home with appliances on, etc. and is higher risk and the risk will go down when the other person is home on the weekend and is more conscientious. The insurance levels and features can all be micro-managed and block chain based.

The connected home sensing system 206 may include one or more of the following features: 1) providing a personalized and differentiating product; 2) competitive pricing; and/or 3) effortless experience for the customers.

1) Provide a personalized and differentiating product—the connected home sensing system 206 may analyze and use the data to personalize the insurance solutions real-time. The connected home sensing system 206 collects, observes, and analyzes all of this connected home data. The connected home sensing system 206 may learn patterns about the homeowner and customers using machine learning techniques and/or artificial intelligence techniques. The connected home sensing system 206 may then predict accurate insurance coverages specific to the homeowner and customers. The homeowner and customer may have insurance coverage with an on-demand basis. Some examples are listed below.

A first example, the connected home sensing system 206 may determine if the home has occupants and may determine that the home is being rented. The connected home sensing system 206, may offer a cost-advantageous home-sharing endorsement only for this period of time, and only until the connected home sensing system 206 learns that the renters leave.

A second example, the connected home sensing system 206 may determine if the home is a second home and that the homeowners are not present at the second home. A value-added service may be added and offered for someone to check on the home when the home owners are not present, such as to make sure the water is running so the home does not have the pipes freeze. Other examples may be utilized without departing from this invention.

A third example, the connected home sensing system 206 may provide target service alerts particular to the homeowner, such as an offer for a maintenance package. The maintenance package may include a monthly or periodic payment to maintain everything in the home. The connected home sensing system 206 may also provide additional data to provide targeted maintenance and service reports. For example, the connected home sensing system 206 may determine that one of the appliances or devices is operating different from normal, such as, the dryer is operating in a manner such that it might be a fire hazard. The appliance or device may need a technician to look at the appliance or device. The connected home sensing system 206 may connect the homeowner with a preferred or approved technician to perform the maintenance on the appliance or device. This provides a personalized protection plan based on the needs of the homeowner and customer based on the specific appliances and devices in the home.

2) Competitive pricing—the connected home sensing system 206 may analyze and determine the homeowner's behaviors in the home, such as, operating the laundry machine and then leaving the home or the homeowner cooking and then leaving the home. Each of these actions or behaviors may be considered and proven more dangerous and an insurance company may not desire these actions. The connected home sensing system 206 may analyze the homeowner's usage of the home, appliances, or devices that might affect the actual risk as a homeowner. The connected home sensing system 206 may analyze the homeowner and occupants actions based on the information received from the plurality of cameras or sensors with AI. Today, an insurance company may use the credit of the homeowner as a factor to predict how a homeowner might be risky in the home. In contrast, with the connected home sensing system 206, the homeowner's behavior and actions may provide a behavioral score that replaces part of owner's credit. The connected home sensing system 206 may provide additional insights into the riskiness of the homeowner, any specific risky actions of the homeowner, and any preventative and/or predictive maintenance recommendations for the homeowner.

3) Effortless Experience—By using the data that the connected home sensing system 206 has determined and collected, the connected home sensing system 206 may provide information to help to automate some of the interactions with the homeowner and the home. The connected home sensing system 206 may make the homeowner's actual interaction with an insurance company be easier, such as turning on and off coverages, and making this automated. For example, the connected home sensing system 206 may determine something occurring in the home. Based on this determination, the connected home sensing system 206 can automatically turn on a certain insurance coverage for the homeowner, instead of the homeowner proactively having to think to call the insurance company. In another example, the connected home sensing system 206 or insurance company may know that a claim has been initiated and the connected home sensing system 206 may identify and sense that the experience may be different than it would have been. For example, a "Home Safety Solution" may include insurance that comes with a package of sensors like a water leak sensor, a motion sensor, or something similar. In order to carry insurance, the homeowner will also have these sensors installed and operational to share the data from these sensors through the connected home sensing system 206. After these sensors are installed and sharing data, the homeowner may receive pricing that may vary and the homeowner may receive discounts for sharing that data and information. The insurance includes a plurality of sensors that factor into the homeowner's insurance pricing and rates. Additionally, a service component may be included to provide the homeowner proactive alerts and personalized alerts that allow the insurance company to give the homeowner different services, but that are included with the insurance coverage. For example, the home owner may pay in advance to get access to these value added services and the sensors, but the home owner will save money in the long run as there will be less risk of claims and catastrophes.

In an aspect of the invention, a connected home sensing system 206 may include various analysis and data to determine various rating variables. For example, how a homeowner utilizes and operates an alarm system may be a rating variable as the homeowner may be a higher/lower risk toward theft based on the usage of the alarm system. Additionally, the presence of alarm system is not the same as turning the alarm system "on". Additionally, opening and closing a garage door often may reflect occupancy in the home, thereby providing occupancy data to the connected home sensing system 206. Occupancy data can be used as a predictor of loss and potentially used to prefill forms for users and customers based on their occupancy data.

Connected Home—Behaviors

In an aspect of the invention, the connected home sensing system 206 may include generating insurance policies that follow a customer based on where the customer is located. For example, insurance may follow the customer from a home to an auto, etc., when the customer is in the home or in the auto. In some examples, user behaviors in each location as determined by the connected home sensing system 206 may be used to further determine pricing for each location.

In other aspects of this invention, the insurance can be more than just the home, such as "follow-me" insurance. For example, the customer may move from a car to the customer's home and therefore, the insurance coverage can be turned on and off based on the location and the behavior of the customer. The connected home sensing system 206 may track various data.

In an aspect of the invention, the connected home sensing system 206 may sense and determine when a new device is installed in the home and the connected home sensing system 206 may track behaviors based on the new device and other devices that tell the insurance company something about the homeowner's risk. By having that new device installed in the homeowner's home, the connected home sensing system 206 can adjust the homeowner's risk by owning and operating the new device and thus preventing losses or accidents from happening in the first place. The connected home sensing system 206 may even change the risk by giving the homeowner feedback. The connected home sensing system 206 may also change the risk because the homeowner is aware that the new device is installed and thus the homeowner changes the behavior to a less risky behavior.

Insurance coverage utilizing the connected home sensing system 206 can change insurance coverage from a reactive force to a proactive force. Generally, insurance is a service for fee industry. The connected home sensing system 206 provides an ability to add services into the insurance industry and model, such as improving risk collection. The connected home sensing system 206 may be offered to people so that they can take these packages and be at a different risk, and the insurance company actually knows what the customer's do instead of predicting what the customers do. The insurance coverage with the connected home sensing system 206 may include other services such as: personalized pricing; loss control; better customer experiences; and knowledge creation. For example, when the connected home sensing system 206 collects all this data, that data can be utilized and monetized in other ways. The insurance company may be able to interact with the customers more frequently than today, using the sensors and incorporating these services.

Generally, through the connected home sensing system 206, the data may not be available when initially writing the insurance policy vs. having the data once the insurance company has written the policy and after the customer is in the home. By tracking the customer behavior, the insurance company can provide value add to that customer or change the customer's behavior or change the risk in that. The initial read on what type of risk for a customer is important and key. In one aspect of the invention, the connected home sensing system 206 may include tracking data related to locations over time. For example, the connected home sensing system 206 has information and data about a home that a first homeowner moves out of. Then, when a new home owner/customer comes in and gets a quote for an insurance policy for that home, the insurance company should be able to use the information already available on that home. By including this information and data, the process can be expedited and the insurance company may know more about that risk than the insurance company would otherwise know.

For example, the insurance company may have a policy before the insurance company installed a new roof on that home, so the insurance company now knows what type of risk that roof includes. The connected home sensing system 206 may provide data that is included also, such as the insurance company knows how the home was "operating" before because the insurance company has the data from the previous owners of the home. The insurance company is able to know the risk from the home, even without knowing the individual customer risk associated with the new customers, because the home has a risk associated with the home as well.

Connected Home—Digital Safety

In an aspect of the invention, the connected home sensing system 206 may provide a system for improving digital security associated with personal data collected by the connected home sensing system 206. The connected home sensing system 206 may leverage various digital safety products to improve security.

There is a need for digital security when it comes to all of this data collected and acquired by the connected home sensing system 206. In addition to making a homeowner safer, it is possible to leverage the connected home sensing system 206 to also protect the safety of the homeowner's data.

Smart home solutions offer a range of promises to consumers: cost savings through energy efficiency, optimal entertaining via integrated sound systems and lighting, and home security through motion-activated cameras, among others. The common thread throughout all these offerings is a new vulnerability for malevolent actors to intrude upon consumers' digital homes. A platform may provide and integrate the cybersecurity features of a digital safety system with the protection of the insurance company's home insurance, all within a platform that provides oversight across the users' connected home. The platform offers content and services across the customer journey from education and product selection to ongoing home management.

In the coming years, there will be an explosion in the number of smart home products and services on the market, adoption rates, and connected items per household. These "smart" products include security (cameras, locking systems), infrastructure (leak detection, smart appliances) and entertainment (lighting, smart TVs), among other categories, that address different user needs from different angles. The issue may be that there is no unified platform to manage all these different "smart" categories, and the products present new digital security threats that homeowners previously were not exposed to. Wherever there is a smart home device, a security threat is not too far behind.

The connected home sensing system 206 may include a platform that allows users to effectively manage their evolving smart home's footprint and provides peace of mind protection. The platform may offer value to all consumers, across a range of services from free content to subscription services.

The new platform may leverages the technology of digital safety systems and other in-house technological capabilities, along with the brand strength and market presence of insurance company's home insurance business. The platform may enable consumers to manage their smart homes and smart devices from a centralized platform, and manage and protect that increasingly "smart" environment.

Traditional home insurance is a backstop that protects a homeowner's assets, but the digital safety platform is the first service to protect the homeowner's digital home.

Connected Home—Data/Activity Through Router

In an aspect of the invention, the connected home sensing system 206 includes a system for pricing insurance based on data gathered via a router in the home. For example, various types of data may pass through a router. A router may be any device that stores or allows data to pass through to enhance the connected home, such as a smart hub, networked home, smart speaker, etc. This data may be leveraged to understand age of appliances and other devices, how well a user maintains his or her home, usage information, and the like.

Utilizing all data collected by the connected home sensing system 206 for a long history, an insurance company or other entity would gather important information and data flowing through the home router about that home, the occupants, and the overall history of that home. The connected home sensing system 206 may be able to analyze the collected and history of data. For example, the insurance company may be able to determine the age of the homeowner's appliances and everything about the other appliances and devices within the home because all the data has been flowing through the router. Even if this data and information was with a previous homeowner living in the home, the insurance company may know a lot of information about the home and the contents of the home. The insurance company may then be able to price the insurance coverage instantly and accurately utilizing the information from the home and based on the owner's behavior, the pricing of the insurance coverage.

Currently there is usage-based insurance for auto, and this aspect of the invention provides a usage-based insurance for home by rating the homeowner based on what the insurance company knows about the homeowner. Today, the insurance company determines and calculates the home insurance on what the insurance company is predicting, or what the insurance company thinks and compares the homeowner with other homeowners that are similar. By utilizing the data from the connected home sensing system 206, the insurance company is able to determine: the home owner's behavior, who is in the home, how old the home is, the appliances and usage of appliances in the home, how susceptible the roof is to failure based on the age of the roof, and the weather history and patterns in the area, etc. This connected home sensing system 206 provides the insurance company collection and analysis tools to be able to customize insurance to each of the individual users and homes.

Generally, for usage-based insurance for an auto, the owner might own more cars and for less time. In contrast, for usage-based insurance for a home, a home may have multiple people moving through it and owning it over a longer period of time. An average car lasts 11 years and has approximately two owners and a home lasts 40 years and has four different owners. Therefore, the data and information from the connected home sensing system 206 about that home is important and provides valuable usage and risk information to an insurance company.

Further, in another aspect of this invention, the connected home sensing system 206 may include a rating plan that recognizes risk units. The risk units may not be based on time and value like traditionally for the home. Rather, the risk units may be based on data and information from the connected home sensing system 206 like: Kilowatt hours used, gallons of water flowing into the home, sump pump usage, amount of natural gas used, average temperature in the home, loads of dishes/laundry done, megabytes of data flowing through the router of the in-home Wi-Fi system, number of times the garage door or front door opens and closes, amount of time the alarm system is activated to the "away" mode, etc.

Additionally, other pieces of information and data may be indicators of risk for a home and a home owner, such as how many people live in the home, when people are home vs. away, type of people who live there (adults vs. kids vs. teens), etc. The connected home sensing system 206 with a plurality of cameras and sensors with AI may be able to indicate the number of occupants and when the occupants are home and away from the home. The connected home sensing system 206 may collect and analyze this data and use this data as additional risk units or rating factors or, more importantly, the base unit of risk for a home. Additional data may be utilized with one or more sensors included in appliance and devices with homes outfitted with devices like smart thermostats, smart speakers, etc.

In an aspect of the invention, the connected home sensing system 206 may include electrical monitoring sensors to determine how well people maintain their home and/or how often people make improvements. For example, the connected home sensing system 206 may determine how often the homeowner has the vacuum running. The connected home sensing system 206 may also determine when the homeowner makes upgrades to their home, such as when they are using heavy machinery (high electrical load), which could mean that the homeowner is building something or fixing something. The connected home sensing system 206 may gather data through the router that helps to determine and detect if the homeowner is a person that always fixes items in the home or updates the home. In another example, the connected home sensing system 206 may determine the use of a water sprinkler system, mowing a lawn, and how often the owner uses it to take care of the lawn. The insurance company could determine that a person who takes care of their lawn is going to be a lot less risk than someone that never mows their lawn, never sprinkles, and just not do anything. Each of these determinations may tell the insurance company something about the risk, the homeowner, and their home versus someone who just does nothing to their home ever.

On the home improvement side, the connected home sensing system 206 may include electrical monitoring sensors to determine large improvements to the home. For example, when installing a new deck, the installers use high electrical load machinery for a long period of time running electrical equipment and building the deck. The connected home sensing system 206 may help to predict when there is an upgrade to the home. While an upgrade to the home might not be a risk predictor, it may cause an insurance agent to follow-up with the homeowner to inquire about additional work being done and whether or not anything additional needs to be added or changes to the current coverage.

In an aspect of the invention, the connected home sensing system 206 may provide router information and router data that provides an understanding of the number of devices that are connected to the router at home. The number of device information may be utilized to provide the number of occupants in the home, how often the occupants are present in the home, or what activities the occupants are participating in. For example, the data and information from the router may provide that Monday through Friday there is always someone in the home from one time to another time, but on weekends, no one is present in the home. This occupancy information may be utilized for various risk determinations.

In an aspect of the invention, the connected home sensing system 206 may include sensors for water usage to determine a home owner's behaviors with respect to water usage. For example, acoustics can monitor the water usage just as acoustics is used to detect leaks currently. For example, everyone occupying the home must use water, such as using the bathroom on a periodic basis. This water usage information may be utilized by the connected home sensing system to further define the homeowner's behaviors.

The collecting and analysis of this vast amount of information over years and years, from the sensors and smart devices with the connected home sensing system 206 may benefit an insurance company. The insurance company may fundamentally change how the insurance company rates and underwrites the insurance products.

Currently, because the information about homeowners and customers is unknown and there is an imperfect understanding of the risk, insurance discounts may be used to supplement insurance coverage that has been overpriced or inaccurately provided. By having all of this data and information from the connected home sensing system 206, insurance discounts to supplement to insurance coverage may be not necessary. By using this data and information from the connected home sensing system 206, discounts may not be necessary because the insurance company may rate and provide insurance coverage based on a perfect (or close to perfect) understanding of the risk of the homeowner and home. This is similar to the customer actually using up risk units similar to a mileage type unit or burning up the risk units as the customer does different activities or as the insurance company tracks different information about the home owner in real time.

The insurance company can then become more efficient with insurance pricing coverage because the insurance company can determine and reduce or eliminate the volatility in the business because the insurance company knows more information and data from the connected home sensing system 206. The insurance company can diversify by moving away from insurance and risk and generate more revenue through alternative services and protection space.

In an aspect of the invention, the data and information from the connected home sensing system 206 and the router can be used so that the experience with the customer is simpler. For example, an insurance agent may not need to ask as many different questions, as the insurance agent already most likely knows the answers to these questions. This data and information from the router makes the customer experience easier and this known data and information can be used as a pre-filled form, used for the coverage ratings, and used for underwriting. In some instances, the insurance company may use the data and information to make the determination that they are not interested in the customer because the risk is too high or the risk in the home is too high. The insurance company may know enough about the home already to know that the home is too risky and not worth the insurance risk. Therefore, the data and information from the connected home sensing system 206 and the router can be used to underwrite as well to price insurance coverage.

In an aspect of the invention, the data and information from the connected home sensing system 206 and the router can be used so that the insurance company can tell a vendor to be ready for selling a washing machine shortly, so the insurance company can monetize that piece of data, because the insurance company has that information.

In an aspect of the invention, the connected home sensing system 206 provides a method and system that collects and analyzes information from connected devices in a home to determine risk, determine rating plans, and generate risk scores from the collected data with usage-based insurance. The method and system can generate claims based on the analyzed information. The method and system recommends services to users based on the analyzed data. The system can alert others in neighborhood to abnormal conditions or recommend preventive actions based on the analyzed data. In various aspects of this invention, the connected home sensing system 206 may include: 1) a risk score and home insurance, or 2) a risk score and recommendations, or 3) a risk score, home insurance, and recommendations.

For example, the connected home sensing system 206 and router may provide a system that determines and insurance rate on various different usage rates. One such usage rate may be per kilowatt-hour (use more electricity is lower risk for theft, home more often, higher risk for fire). The use of more electricity could mean more people living in home. Similarly, more water flow may tell number of people living in the home. Additionally, the amount of data flowing through the router may tell how many people in home, age of people in the home, etc. The connected home sensing system 206 may tell the insurance company details about the smart devices and appliances that are connected in the home, such as more loads of laundry means more people in the home.

Generally, the connected home sensing system 206 provides a system capable of collecting information and learning about the occupants in a home and how the occupants behave to let the insurance company more accurately assess risk and provide insurance rates. The information and data from the connected home sensing system 206 may be used to rate insurance policies and to make recommendation to consumers (could be insurance coverage recommendations, maintenance recommendations, or to automatically file claim). A consumer risk profile, or risk score for the people or home may be calculated and determined. The connected home sensing system 206 may provide risk assessment, insurance rating plans, or loss prevention.

The following are some examples of information and data from the connected home sensing system 206: connected doorbells, garage opening/closing—may tell number of guests coming/going; determining whether people shut off the lights, TV (may indicate more responsible); excessive or above average stove use and fire risk; dryer vent cleaning needed—took longer to dry clothes (sensor on dryer to tell increase in drying time, may mean clean vent); carbon monoxide sensors (heaters in attics or a plugged pipe)—sensor connected to hub give email warnings; sewage backup sensor; cameras and sensors with artificial intelligence flagging an intruder if an occupant in a home is not recognized; and neighborhood alerts, sending an alert to others in neighbored based on problems one neighborhood home is having.

The connected home sensing system 206 may include a database with database building and an alert to consumers. The database stores data and information that may be used to score and to price insurance policies and also alert neighbors.

In an aspect of the invention, the connected home sensing system 206 may collect unexpected traffic coming through home router from outside—monitor traffic flow. Based on this information and data, the connected home sensing system 206 may recommend changes to other devices because homeowner is not there and the homeowner may have forgot to change those settings. The absence of activity may mean something is wrong, such as an older person needing help or not having used the bathroom in two hours may indicate a problem, such as a doorway sensor.

In an aspect of the invention, the connected home sensing system 206 may include the analysis and collection of a cell phone signature that has not been seen in home, and a microphone of live feed to protect from home invasion. Additionally the connected home sensing system 206 may use a microphone of smart device, such as a phone or smart speakers, in emergency. In another aspect of the invention, the connected home sensing system 206 may include cameras and sensors that are capable of recognizing people with artificial intelligence (AI), such as with speech recognition, image recognition, face scanning, computer vision, or machine learning. These cameras and sensors with AI may be able to provide analysis and collection to identify a potential intruder or home invasion based on someone not seen in the home.

Connected Home—Location/Scores/Neighborhood Scores

In an aspect of the invention, the connected home sensing system 206 may include a system for determining a neighborhood score for use in pricing insurance policies. For example, data from smart thermostats, age of household, other data may be used to generate a score for each home in a neighborhood. This individual home score may then be aggregated with individual user data to price an insurance policy for a given home.

The connected home sensing system 206 may conduct analysis of one or more territories. Territories can be very predictive on the home side because the location of home matters just as much as what the home looks like and whom the homeowner and occupants are. Weather events like high winds and hail are based solely on where the weather event occurs or is more likely to occur, not how well the roof is kept or other factors associated with the home and the homeowner. It doesn't matter if the home owner is a low risk, individually a low risk or high risk, the weather event with high winds or hail will hit the home the same and causing the same amount of damage. Knowing territorial data of the home and the surrounding homes can help with the predictive nature of a home within a territory or neighborhood. For example, the connected home sensing system 206 may share the data and information from any security cameras and other external devices within the neighborhood or territory.

Additionally, in another aspect of this invention, the connected home sensing system 206 may include thermostat data from various customers within a neighborhood or territory. The thermostat data may provide heating and cooling information to be predictive of homes in the neighborhood or territory that do not have smart thermostats. Knowing the temperature changes or what people are doing, or even electrical usage, may provide additional data and information from a pricing perspective and may be correlated with a loss.

In an aspect of this invention, the connected home sensing system 206 may provide a score for the neighborhood or the street based on the data and information collected about the individual homes on this street. The connected home sensing system 206 may determine commonalities within the homes on the street or within the neighborhood, so the connected home sensing system 206 may score the homes within the neighborhood similarly. In another aspect of this invention, the connected home sensing system 206 may include a unique score for every home within the neighborhood or on the street, but the street or neighborhood may be included in that score.

The connected home sensing system 206 will collect and determine everything that there is to know about a home and this may be used to generate a home score. Additionally, information about the homeowner, the occupants, the behaviors, etc. may then be used in conjunction with the data and information about the home and the neighborhood or street to determine a comprehensive homeowner score or rating score. A prospective customer can come to an insurance company and the prospective customer will have a universal comprehensive homeowner score that can be combined with the individual home score to determine the pricing and rates available for insuring that home.

In an aspect of the invention, the connected home sensing system 206 may provide services or discounts even for homeowners without perfect information. For example, if all of a homeowner's neighbors behave similarly, the insurance company may use that information to give the homeowner a discount or a certain product or to sell the homeowner something additional with the insurance. Just because the insurance company does not have the homeowner's data, the insurance company may be able to determine that the homeowner is similar to the neighbors. Based on this determination, the insurance company may try to sell any similar additional products because all of the homeowner's neighbors live a similar way.

In an aspect of this invention, the connected home sensing system 206 may collect data and information about homes within a neighborhood that may be utilized for other industries or needs outside the insurance industry. For example, theft data for various neighborhoods may be beneficial for city governments, etc.

In an aspect of this invention, the connected home sensing system 206 may collect data and include information about the specific location of the home, such as is the home facing north, south, east, or west. Various weather related incidents, such as storms, hail, or high winds, may affect homes different based on the direction the home is facing. Additionally, location can be important even from a simple elevation information. With tornados, in the same neighborhood, the homes located at a slightly higher elevation could be hit much harder by a tornado than the homes that located at a lower elevation.

In an aspect of this invention, the connected home sensing system 206 may also analyze the neighborhood data and information with respect to theft. For example, the connected home sensing system 206 determines that the home is not occupied based on the homeowner's data. However, the connected home sensing system 206 may also be able to determine the neighbor's data and whether they are occupied. Having an unoccupied home surrounded by occupied homes is probably safer than an unoccupied home surrounded by all unoccupied homes, because there may be more people on the streets and more activity within the neighborhood, the homes may be less likely to get broken into.

Aspects of the disclosure relate to computer hardware and software. In particular, one or more aspects of the disclosure relate to neighborhood safety score(s), which enable customers to evaluate neighborhoods using one or more data sources (claims, catastrophic models, and crime and weather data).

In an aspect of the invention, the computing system creates a model/safety score(s) using all of the applicable data. The scores could be made available to consumers through real estate websites (Zillow, Redfin, etc.) or through an entity's quote process where it could result in recommendations for additional policies or coverages. An individual could use the scores as a way to help them get comfortable with a neighborhood especially if they are looking in an area that they are not familiar with. For example, a prospective buyer may not realize an area has an increased flood or fire risk. Moreover, the scoring could lead to increased coverage limits, more products bought or changes to the property to reduce risk.

When an individual is looking to move to an area he/she often is not familiar with, he/she may not be aware of typically problems associated with the area such as the crime rate, an increased risk of flood or fire. One or more model and safety score may be generated using data (such as claims data, catastrophic models, weather and crime). The scores could be made available for purchase to consumers through real estate websites (Zillow, Redfin, etc.) or the websites themselves would want to purchase it. A person could use the scores as a way to help them get comfortable with a neighborhood especially if they are looking in an unfamiliar area. For example, the buyer may not realize an area has an increased flood or fire risk. It could lead to increased insurance coverage, more products bought or changes to the property to reduce risk.

A set of scores could be created using a variety of data we already possess. There could be one overall score and then more detailed scores by topics such as crime rate, fire/flood/storm risk. Coverage recommendations would be based on scores.

People moving to a new area are interested in information from a trusted source. The information from the connected home sensing system 206 may be utilized to provide information to people moving into a new area.

In another aspect of the invention, the connected home sensing system 206 may include a system for determining a condition of a roof of a home based on sensor data collected inside the home. This system may aid in more accurately pricing insurance policies based on data unique to the geographic region and particular structure rather than just age of the roof. For example, the connected home sensing system 206 may know the age of the roof and that changes year over year. By knowing the age of the roof, the insurance company can rate the insurance coverage specifically to that home with that age of roof.

Various weather events cause a roof to wear longer or shorter. With the roof, weather is important. A roof in one location with extreme heat and extreme cold and snow and ice sitting on the top of the roof, ages differently than a roof in a milder weather location without the extreme heat and cold. Additionally, the roof may age differently based on direction the roof is facing the sun. For example, an insurance company cannot look at two homes with 10-year-old roofs and say that the quality of both or the remaining life is the same. The remaining life of the both roofs could be completely different. There could be a roof that is 30 years old that is actually better to resist weather than a roof that is 5 years old based on where the roof is located and what direction the roof is facing.

The connected home sensing system 206 may include various sensors that help us predict the status of the homeowner's roof. For example, the connected home sensing system 206 may include sensors on cooling/heating cables that are located on a roof. Additionally, the connected home sensing system 206 may include sensors for the temperature and humidity in the attic to help determine the quality and status of the roof. Additionally, the connected home sensing system 206 may include aerial imagery and sensors to determine how good the roof is performing to the factors within the roof specification. Additionally, the connected home sensing system 206 may include solar panels or solar powered shingles data that would provide information.

In another aspect of the invention, the connected home sensing system 206 may include a system for pricing a policy to include a premium amount for cost of coverage and an amount directed to preventative tasks. For example, a user may pay one amount to the insurance provider and a portion of that amount may be directed to premium while another portion may be used to perform preventative maintenance tasks. This may help to reduce risk associated with a user.

From a preventative standpoint, the connected home sensing system 206 may include electrical monitoring sensors that are connected into the home's electrical system that can tell the homeowner what mechanical system may be drawing too much power and might be coming close to a breakdown. This allows the connected home sensing system 206 to notify the homeowner about this mechanical system to call a technician to look at the mechanical system, such as a furnace, and prevent having to replace the furnace.

In an aspect of the invention, the connected home sensing system 206 may include generating an insurance premium that includes a preventative portion and a service portion, such as providing a new service.

For example, the insurance company may provide data and information from the connected home sensing system 206 to provide protection and prevention verses fixing something after it has already failed. Because of this, the insurance company is shifting loses or underwriting gains to an expense or a value add to the customer.

example, consider an insurance premium that is based on $1000 of loss costs and a 20% chance of having an accident. The insurance company may be able to decrease the $1000 of lost costs by leveraging technology to detect and recommend or provide preventative and maintenance services. In other words, the insurance company may provide value added services to the customer, e.g., decrease the 20% chance of having an accident to 10%, while charging the same insurance premium to the customer. E.g., Current/Previous: total insurance premium=$1000
loss costs based on 20% chance of accident+
operating expenses.

New: total insurance premium=$1000 ($500 loss costs+ $500 preventative expenses) based on 10% chance of accident+operating expenses. Alternatively, the total insurance premium may include a $500 preventive expenses service contract offered by a non-insurance affiliate and then the insurance company may offer a $500 discount on the insurance premium for policyholders with that service contract in place.

The customer will be in a better situation because they are paying the same total insurance premium, but there is now a prevention of losses and/or additional value added services for the customer.

Figure 8A:
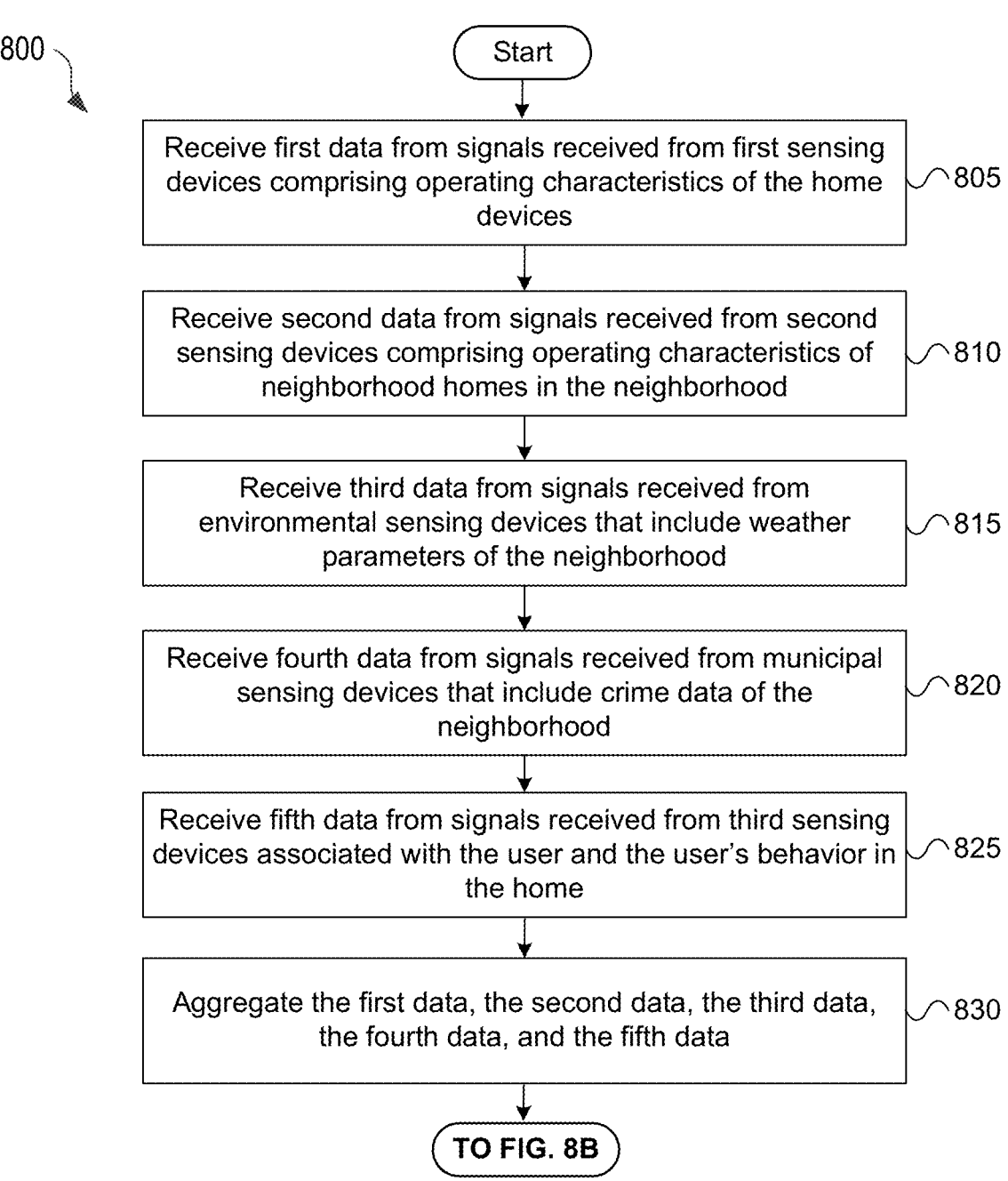

FIGS. 3-8B illustrate example methods in accordance with the connected home sensing system 206 and other sensing systems. Specifically, FIG. 3 illustrates a method of a connected home sensing system 206 providing an insurance rating plan using risk units associated with a user and a home. FIG. 4 illustrates a method of a method of a connected home sensing system 206 providing an insurance rating plan for a user following from a home to an automobile. FIG. 5 illustrates a method of a method of a connected home sensing system 206 providing an insurance rating plan based on historical tracking data related to a specific home over time. FIG. 6 illustrates a method of a connected home sensing system 206 providing an insurance rating plan based on neighborhood occupancy data and providing neighborhood information to users. FIG. 7 illustrates a method of a connected home sensing system 206 providing an insurance rating plan based on user behavior data, home data, neighborhood home data, weather data of the neighborhood, and crime data of the neighborhood. FIGS. 8A and 8B illustrate a method of a connected home sensing system 206 providing an insurance rating plan based on historical tracking data related to a specific home and neighborhood homes over time. The methods illustrated in FIGS. 3-8B may be performed by a special-purpose computing application/device, such as the connected home sensing system 206. The methods may be performed by and or embodied in the connected home sensing device/system 101, the connected home sensing system 206, one or more application programs 119, wireless computing devices 141, and/or any other suitable combination thereof. Although discussed briefly here, it is to be understood that the varied features discussed above with respect to FIGS. 1, 2A, and 2B may be incorporated in the methods illustrated in FIGS. 3-8B as appropriate.

As stated above, FIG. 3 illustrates a method of a connected home sensing system 206 providing an insurance rating plan using risk units associated with a user and a home. At step 305, the connected home sensing system 206 receives first data from signals received from first sensing devices comprising operating characteristics of the home devices. At step 310, the connected home sensing system 206 receives second data from signals received from second sensing devices associated with the user and the user's behavior in the home. At step 315, the connected home sensing system 206 aggregates the first data and the second data. At step 320, the connected home sensing system 206 assigns home risk units based on the first data and the home devices. At step 325, the connected home sensing system 206 assigns user risk units based on the second data and the user's behavior in the home. At step 330, the connected home sensing system 206 aggregates the home risk units and the user risk units to determine an overall risk unit associated with the user. At step 335, the connected home sensing system 206 generates an insurance premium for the user based on the overall risk units associated with the user. At step 340, the connected home sensing system 206 updates the insurance premium for the user based on any changes to the home risk units, the user risk units, and the overall risk units associated with the user.

As stated above, FIG. 4 illustrates a method of a connected home sensing system 206 providing an insurance rating plan for a user following from a home to an automobile. At step 405, the connected home sensing system 206 receives first data from signals received from first sensing devices comprising operating characteristics of the home devices. At step 410, the connected home sensing system 206 receives second data from signals received from second sensing devices associated with the user and the user's behavior in the home. At step 415, the connected home sensing system 206 receives third data from signals received from third sensing devices comprising operation parameters of a vehicle. At step 420, the connected home sensing system 206 aggregates the first data, the second data, and the third data. At step 425, the connected home sensing system 206 generates an insurance premium for the user based on whether the user is located in the home or the vehicle and follows the user from the home to the vehicle based on the first data and second data for the home and the third data for the vehicle. At step 430, the connected home sensing system 206 updates the insurance premium for the user based on any changes in the first data and second data for the home and the third data for the vehicle. At step 435, the connected home sensing system 206 generates an insurance premium for the user based on the overall risk units associated with the user. At step 440, the connected home sensing system 206 updates the insurance premium for the user based on any changes to the home risk units, the user risk units, and the overall risk units associated with the user.

As stated above, FIG. 5 illustrates a method of a connected home sensing system 206 providing an insurance rating plan based on historical tracking data related to a specific home over time. At step 505, the connected home sensing system 206 receives first data from signals received from first sensing devices comprising operating characteristics of the home devices. At step 510, the connected home sensing system 206 receives second data from signals received from second sensing devices associated with the user and the user's behavior in the home. At step 515, the connected home sensing system 206 receives third data from signals received from third sensing devices associated with occupants' behavior in the home. At step 520, the connected home sensing system 206 aggregates the first data, the second data, and the third data. At step 525, the connected home sensing system 206 maintains and aggregates historical first data about the home from previous owners that includes the first data aggregated over time from the first devices. At step 530, the connected home sensing system 206 maintain and aggregates historical second data about the user that includes the second data aggregated over time from the user and the user's behavior in previous homes. At step 535, the connected home sensing system 206 maintains and aggregates historical third data about the occupants that includes the third data aggregated over time from the occupants' behavior in previous homes. At step 540, the connected home sensing system 206 generates a new insurance premium for the user and a new home based on the historical first data, the historical second data, and the historical third data.

As stated above, FIG. 6 illustrates a method of a connected home sensing system 206 providing an insurance rating plan based on neighborhood occupancy data and providing neighborhood information to users. At step 605, the connected home sensing system 206 receive first data from signals received from first sensing devices comprising operating characteristics of the home devices. At step 610, the connected home sensing system 206 receive second data from signals received from second sensing devices comprising operating characteristics of neighborhood homes in the neighborhood. At step 615, the connected home sensing system 206 receives third data from signals received from environmental sensing devices that include weather parameters of the neighborhood. At step 620, the connected home sensing system 206 receives fourth data from signals received from municipal sensing devices that include crime data of the neighborhood. At step 625, the connected home sensing system 206 aggregates the first data, the second data, the third data, and the fourth data. At step 630, the connected home sensing system 206 determines occupancy rates of the neighborhood homes based on the first data and the second data. At step 635, the connected home sensing system 206 generates and update an insurance premium based on the aggregated data and the occupancy rates of the neighborhood homes. At step 640, the connected home sensing system 206 provides neighborhood information to one or more potential users that includes the neighborhood home data, weather parameters for the neighborhood, and crime data for the neighborhood.

As stated above, FIG. 7 illustrates a method of a connected home sensing system 206 providing an insurance rating plan based on user behavior data, home data, neighborhood home data, weather data of the neighborhood, and crime data of the neighborhood. At step 705, the connected home sensing system 206 receives first data from signals received from first sensing devices comprising operating characteristics of the home devices. At step 710, the connected home sensing system 206 receives second data from signals received from second sensing devices comprising operating characteristics of neighborhood homes in the neighborhood. At step 715, the connected home sensing system 206 receives third data from signals received from environmental sensing devices that include weather parameters of the neighborhood. At step 720, the connected home sensing system 206 receives fourth data from signals received from municipal sensing devices that include crime data of the neighborhood. At step 725, the connected home sensing system 206 receives fifth data from signals received from third sensing devices associated with the user and the user's behavior in the home. At step 730, the connected home sensing system 206 aggregates the first data, the second data, the third data, the fourth data, and the fifth data. At step 735, the connected home sensing system 206 generates an insurance premium for the user based on aggregated data from the first data, the second data, the third data, the fourth data, and the fifth data. At step 740, the connected home sensing system 206 updates the insurance premium for the user based on any changes in the first data, the second data, the third data, the fourth data, and the fifth data.

As stated above, FIGS. 8A and 8B illustrate a method of a connected home sensing system 206 providing an insurance rating plan based on historical tracking data related to a specific home and neighborhood homes over time. At step 805, the connected home sensing system 206 receives first data from signals received from first sensing devices comprising operating characteristics of the home devices. At step 810, the connected home sensing system 206 receives second data from signals received from second sensing devices comprising operating characteristics of neighborhood homes in the neighborhood. At step 815, the connected home sensing system 206 receives third data from signals received from environmental sensing devices that include weather parameters of the neighborhood. At step 820, the connected home sensing system 206 receives fourth data from signals received from municipal sensing devices that include crime data of the neighborhood. At step 825, the connected home sensing system 206 receives fifth data from signals received from third sensing devices associated with the user and the user's behavior in the home. At step 830, the connected home sensing system 206 aggregates the first data, the second data, the third data, the fourth data, and the fifth data. At step 835, the connected home sensing system 206 receives historical information about the neighborhood homes in the neighborhood. At step 840, the connected home sensing system 206 analyzes the historical information about the neighborhood homes including historical insurance premiums and insurance claims for the neighborhood homes. At step 845, the connected home sensing system 206 generates and update a new insurance premium for a new home based on the historical insurance information about the neighborhood homes in the neighborhood.

In an aspect of the invention with respect to the methods described in FIGS. 3-8B and the systems detailed, the connected home sensing system 206 may provide real-time data (i.e. first data, second data, etc.) to the terminals 141 and 151 which may be personal computers, servers (e.g., web servers, database servers), or mobile communication devices (e.g., mobile phones, mobile devices, laptops, portable computing devices, and the like). Further, the connected home sensing system 206 may provide real-time output of the insurance premium for the user to the terminals 141 and 151. Additionally, the connected home sensing system 206 may provide real-time updates to the insurance premium when any changes occur for the user to the terminals 141 and 151.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, one of ordinary skill in the art will appreciate that the steps illustrated in the illustrative figures may be performed in other than the recited order, and that one or more steps illustrated may be optional in accordance with aspects of the disclosure. Further, one of ordinary skill in the art will appreciate that various aspects described with respect to a particular figure may be combined with one or more other aspects, in various combinations, without departing from the invention.

While the preferred embodiments of the invention have been shown and described, it will be apparent to those skilled in the art that changes and modifications may be made therein without departing from the spirit of the invention, the scope of which is defined by this description.

We claim:

1. A connected home device comprising:
a wireless network interface;
one or more processors; and
a memory unit storing computer-executable instructions, which when executed by the one or more processors, cause the connected home device to:
  receive, using the wireless network interface, a first data transmission from one or more home sensor devices within a home, the first data transmission including home sensor data generated by the one or more home sensor devices;
  receive, using the wireless network interface, a second data transmission from a vehicle parked outside the home, the second data transmission including vehicle sensor data generated by one or more vehicle sensor devices positioned to monitor areas external to the home, wherein the vehicle sensor data includes an ambient condition around the vehicle parked outside the home;
generate a home profile by analyzing the home sensor data and the vehicle sensor data to establish a normal usage pattern of the home and the areas external to the home;
identify that a person is entering the home based on a deviation from the home profile by detecting differences between the home profile and current sensor readings from the one or more home sensor devices or the one or more vehicle sensor devices;
determine that the deviation corresponds to a burglary which is occurring in the home;
determine a reactive measure based on a determination that the burglary is occurring, wherein the reactive measure comprises a message and an identification of at least one recipient, and wherein the reactive measure triggers a preventive action with at least one home sensor device of the one or more home sensor devices to prevent the burglary from continuing; and
send the message to a computing device associated with the at least one recipient.

2. The connected home device of claim 1, wherein:
the one or more home sensor devices includes a camera; and
identifying that the person is entering the home includes performing artificial intelligence-based image recognition.

3. The connected home device of claim 1, wherein:
the one or more home sensor devices includes a microphone; and
identifying that the person is entering the home includes performing artificial intelligence-based speech recognition.

4. The connected home device of claim 1, wherein the computer-executable instructions, when executed by the one or more processors, further cause the connected home device to recognize whether the person is walking around the home.

5. The connected home device of claim 1, wherein the message includes an alert for potential danger.

6. The connected home device of claim 1, wherein the reactive measure includes transmitting the message to a home device.

7. The connected home device of claim 1, wherein the reactive measure includes an alert to turn on exterior lights.

8. The connected home device of claim 7, wherein the computing device associated with the at least one recipient is at a neighboring home.

9. The connected home device of claim 1, wherein the computer-executable instructions, when executed by the one or more processors, further cause the connected home device to use at least one of the one or more home sensor devices or the one or more vehicle sensor devices to record the burglary.

10. A connected home system comprising:
a wireless network interface;
one or more home sensor devices;
one or more vehicle sensor devices; and
a connected home device comprising one or more processors and a memory unit storing computer-executable instructions, which when executed by the one or more processors, cause the connected home device to:

receive, using the wireless network interface, a first data transmission from the one or more home sensor devices within a home, the first data transmission including home sensor data generated by the one or more home sensor devices;

receive, using the wireless network interface, a second data transmission from the one or more vehicle sensor devices of a vehicle parked outside the home, the second data transmission including vehicle sensor data generated by the one or more vehicle sensor devices positioned to monitor areas external to the home, wherein the vehicle sensor data includes an ambient condition around the vehicle parked outside the home;

generate a home profile by analyzing the home sensor data and the vehicle sensor data to establish a normal usage pattern of the home and the areas external to the home;

determine a deviation from the home profile corresponds to a burglary which is occurring in the home by detecting differences between the home profile and current sensor readings from the one or more home sensor devices or the one or more vehicle sensor devices;

determine a reactive measure based on a determination that the burglary is occurring, wherein the reactive measure comprises a message and an identification of at least one recipient, and wherein the reactive measure triggers a preventive action with at least one home sensor device of the one or more home sensor devices to prevent the burglary from continuing; and send the message to a computing device associated with the at least one recipient.

11. The connected home system of claim 10, wherein the one or more home sensor devices include a microphone and a camera inside the home.

12. The connected home system of claim 10, wherein the one or more vehicle sensor devices include a proximity sensor.

13. The connected home system of claim 10, wherein the one or more vehicle sensor devices include a motion sensor.

14. The connected home system of claim 10, wherein the one or more vehicle sensor devices include an external camera of the vehicle.

15. The connected home system of claim 14, wherein the external camera of the vehicle parked at the home records the burglary occurring and transmits a video to the computing device in real-time.

16. A method comprising:

receiving, at a connected home device using a wireless network interface, a first data transmission from one or more home sensor devices located within a home, the first data transmission including home sensor data generated by the one or more home sensor devices;

receiving, at the connected home device using the wireless network interface, a second data transmission from a vehicle parked outside the home, the second data transmission including vehicle sensor data generated by one or more vehicle sensor devices positioned to monitor areas external to the home, wherein the vehicle sensor data includes an ambient condition around the vehicle parked outside the home;

generating a home profile by analyzing the home sensor data and the vehicle sensor data to establish a normal usage pattern of the home;

determining, using one or more processors of the connected home device, a deviation from the home profile corresponds to a burglary which is occurring in the home by detecting differences between the home profile and current sensor readings from the one or more home sensor devices or the one or more vehicle sensor devices;

determining a reactive measure based on a determination that the burglary is occurring, wherein the reactive measure comprises a message and an identification of at least one recipient, and wherein the reactive measure triggers a preventive action with at least one home sensor device of the one or more home sensor devices to prevent the burglary from continuing; and sending the message to a computing device associated with the at least one recipient.

17. The method of claim 16, wherein the message includes an indication of the preventive action.

18. The method of claim 17, wherein the preventive action includes turning on at least one exterior light.

19. The method of claim 16, wherein the one or more home sensor devices includes a camera, and the method further comprises identifying a person in the home by performing artificial intelligence-based image recognition with the camera.

20. The method of claim 16, wherein the one or more home sensor devices includes a microphone, and the method further comprises identifying a person in the home by performing artificial intelligence-based speech recognition with the microphone.

* * * * *